US009174127B2

(12) United States Patent
Sotoike

(10) Patent No.: US 9,174,127 B2
(45) Date of Patent: Nov. 3, 2015

(54) VIDEO GAME WITH MATCHMAKING BASED UPON DENIAL OF COMMUNICATIONS

(75) Inventor: Hiroki Sotoike, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 570 days.

(21) Appl. No.: 12/912,121

(22) Filed: Oct. 26, 2010

(65) Prior Publication Data

US 2011/0105221 A1    May 5, 2011

(30) Foreign Application Priority Data

Nov. 4, 2009   (JP) ................................ 2009-253116

(51) Int. Cl.
| | |
|---|---|
| A63F 9/24 | (2006.01) |
| A63F 13/30 | (2014.01) |
| A63F 13/35 | (2014.01) |
| A63F 13/33 | (2014.01) |
| A63F 13/795 | (2014.01) |
| A63F 13/49 | (2014.01) |

(52) U.S. Cl.
CPC ................ *A63F 13/12* (2013.01); *A63F 13/30* (2014.09); *A63F 13/33* (2014.09); *A63F 13/35* (2014.09); *A63F 13/49* (2014.09); *A63F 13/795* (2014.09); *A63F 2300/204* (2013.01); *A63F 2300/402* (2013.01); *A63F 2300/5586* (2013.01); *A63F 2300/61* (2013.01)

(58) Field of Classification Search
CPC ............ A63F 13/12; A63F 2300/5546; A63F 2300/556; A63F 2300/5566; A63F 2300/5586; A63F 13/30; A63F 13/33; A63F 13/35; A63F 13/795; A63F 13/49; A63F 13/79

USPC ................................................ 463/25, 29, 42
See application file for complete search history.

(56) References Cited

U.S. PATENT DOCUMENTS

| | | | | |
|---|---|---|---|---|
| 6,641,481 | B1 * | 11/2003 | Mai et al. | 463/42 |
| 7,288,027 | B2 * | 10/2007 | Overton | 463/42 |
| 7,367,888 | B1 * | 5/2008 | Chen et al. | 463/42 |
| 7,614,955 | B2 * | 11/2009 | Farnham et al. | 463/42 |
| 8,231,469 | B1 * | 7/2012 | Ford et al. | 463/42 |
| 2002/0115488 | A1 * | 8/2002 | Berry et al. | 463/42 |
| 2006/0247055 | A1 * | 11/2006 | O'Kelley et al. | 463/42 |
| 2008/0207332 | A1 * | 8/2008 | Bortnik et al. | 463/42 |
| 2009/0221365 | A1 * | 9/2009 | Levy | 463/29 |
| 2010/0312889 | A1 * | 12/2010 | Mori | 709/224 |
| 2011/0275439 | A1 * | 11/2011 | Terada et al. | 463/42 |

FOREIGN PATENT DOCUMENTS

| | | | | |
|---|---|---|---|---|
| JP | 2006-212288 | | 8/2006 | |
| WO | WO-2009025124 A1 * | 2/2009 | ............. | A63F 13/12 |
| WO | WO-2009101962 A1 * | 8/2009 | ............. | A63F 13/12 |

* cited by examiner

*Primary Examiner* — Lawrence Galka

(74) *Attorney, Agent, or Firm* — Nixon & Vanderhye, P.C.

(57) ABSTRACT

A game system includes a server, and the server can communicate with and is connected to a plurality of game apparatuses via a network. In a case that a currently-connecting message is not received from any game apparatus during a communication game, the server determines that the game apparatus prematurely ends the communication game, and adds a bad reputation score of each of the players who is participating in the communication game. Furthermore, if the communication game is ended, and there is a game apparatus that refuses to participate in a next communication game, the bad reputation score of the game apparatus who permits participating in the next communication game is added. For example, the player having a high bad reputation score is refused to participate in the next communication game.

18 Claims, 29 Drawing Sheets

(A) TOP VIEW (FOLDED STATE)

(B) LEFT SIDE SURFACE (FOLDED STATE)

FIG. 6

CURRENTLY PARTICIPATING PLAYER LIST

| PLAYER | PREMATURE ENDING FLAG |
|--------|------------------------|
| A | OFF |
| B | OFF |
| C | ON |
| ⋮ | ⋮ |
| N | OFF |

VIDEO GAME WITH MATCHMAKING BASED UPON DENIAL OF COMMUNICATIONS

CROSS REFERENCE OF RELATED APPLICATION

The disclosure of Japanese Patent Application No. 2009-253116 is incorporated herein by reference.

FIELD

The technology herein relates to a game system, a storage medium and a game controlling method. More specifically, the technology herein relates to a game system, a storage medium and a game controlling method that play a communication game via a network, such as the Internet.

BACKGROUND AND SUMMARY

Conventionally, in a communication match-up game executed among a plurality of game apparatuses via a network, if a player falls into a disadvantageous situation, an illegal act of forcibly disconnecting the communication between the game apparatuses to make the match-up invalid is widely spread.

One example of the related art for preventing such an illegal act is disclosed in Japanese Patent Application Laid-Open No. 2006-212288 [A63F 13/12] (Document 1) laid open on Aug. 17, 2006. In the illegal act preventing method disclosed in the Document 1, in a case that a connection between a LAN in a store and a game apparatus is disconnected by a player, abnormal processing is executed so as to be acted as a deterrent to an illegal act onward. For example, a game apparatus transmits and receives packets with another game apparatus via a router during execution of a network match-up game. In a case that no packet is received after a lapse of a predetermined time, a response request is transmitted to the router. If there is no response from the router, by regarding that the player intentionally disconnects an internal network, abnormal processing, such as a forcibly ending the game, recording a score at a time of the disconnection is performed. This makes it possible for the player to lose his or her will to an illegal act of intentionally causing a communication failure by unplugging an LAN cable, etc. in a case that a development of the game is at a disadvantage situation.

The illegal act preventing method disclosed in the above-described Document 1 is for making the player lose his or her will to an illegal act by performing the abnormal processing on the illegal act of forcibly disconnecting the communication by unplugging the LAN cable. However, the illegal act preventing method in the Document 1 is effective for preventing the illegal act of forcibly ending the game and the communication halfway at the disadvantageous situation, but it is difficult to prevent an illegal act of advantageously advancing the game by unexpectedly using the game program, such as remodeling (modifying) of the game software (game program), etc. and an unpleasant act of performing an excessive harassing behavior on an opponent, etc. Especially, such an illegal act and an unpleasant act are recently increasing, and effective measures are requested.

Therefore, it is a primary object of certain example embodiments to provide a novel game system, a novel storage medium and a novel game controlling method.

Another object certain example embodiments is to provide a game system, a storage medium and a game controlling method capable of preventing an illegal act of unexpectedly using a game program from occurring.

In addition, a still another object of certain example embodiments is to provide a game system, a storage medium and a game controlling method capable of preventing an act of making an opponent of the battle game feel unpleasant from occurring.

A first aspect is a game system performing a communication game, and comprises a refusal determiner and a restriction information updater. The refusal determiner determines whether or not one game apparatus is refused to continue the communication game by other game apparatus. The restriction information updater updates restriction information as to the communication game of the one game apparatus in correspondence with a determination result by the refusal determiner.

According to the first aspect, the restriction information of the game apparatus which is refused to continue the communication game is updated, and therefore, it is possible to indirectly detect a person who performs an illegal act of unexpectedly using the game program and an unpleasant act of performing an excessive harassing behavior. Thus, it is possible to reduce and avoid such the illegal act and the unpleasant act.

A second aspect is according to the first aspect, and a game system further comprises a communication object selector. The communication object selector selects a game apparatus being an object of the communication game on the basis of the restriction information of each game apparatus.

According to the second aspect, a game apparatus being an object of the communication game is selected on the basis of the restriction information, and thus, it is possible to easily perform the selection.

A third aspect is according to the second aspect, and the communication object selector selects a plurality of game apparatuses having restriction information at least approximate to each other as objects of the communication game. For example, game apparatuses which have the same or the same level of the restriction information are selected as objects of the communication game.

According to the third aspect, the game apparatuses having restriction information at least approximate to each other are selected as objects of the communication game, and therefore, it is possible to select the players who are considered to have the same or similar evaluation earned from other players can be selected as the objects of the communication game.

A fourth aspect is according to the first aspect, and the game system further comprises a communication game processor which executes a communication game. This communication game processor reflects at least the restriction information of each game apparatus which is participating in the communication game on the processing of the communication game. For example, the player who is more frequently refused to continue the communication game based on the restriction information is determined to be a person who performs an illegal act and an unpleasant act, and thus, an attribute (offensive power, life, performance, etc.) of a player character of such a player is adjusted to be inferior to an attribute of a player character of another player.

According to the fourth aspect, the restriction information is reflected on the processing of the communication game, and therefore, it is possible to reduce and avoid an illegal act of unexpectedly using the game program and an unpleasant act of performing an excessive harassing behavior, etc.

A fifth aspect is according to the fourth aspect, and a game system further comprises a comparator which compares the restriction information of the respective game apparatuses which are participating in the communication game. The communication game processor further reflects a comparison result by the comparator on the processing of the communication game. For example, in a case that a fighting game is played, the restriction information is compared between the game apparatuses (players), and depending on the comparison result, an offensive power of an offensive side is changed, or a decreased amount of a physical strength value of a defensive side is changed. That is, as to the player character operated by the player who performs an illegal act of unexpectedly using the game program and an excessive harassing behavior, the offensive power is decreased, or the decreased amount of the physical strength value is increased.

In the fifth aspect as well, similar to the fourth aspect, it is possible to reduce and avoid an illegal act of unexpectedly using the game program and an unpleasant act of performing an excessive harassing behavior, etc.

A sixth aspect is according to the fourth aspect, and the communication game processor exerts an influence on the communication game when the restriction information satisfies a predetermined condition. For example, assuming that the restriction information is an index in relation to an illegal act and an unpleasant act, in a case that it is determined that the player (frequently) performs the illegal act and the unpleasant act on the basis of such an index, the player is disadvantageously dealt in the communication game. On the contrary, in a case that it is determined that the player does not perform an illegal act and an unpleasant act, the player is advantageously dealt in the communication game. Any one of them may be executed.

According to the sixth aspect, an influence is exerted on the communication game based on the restriction information, and therefore, it is possible to reduce an illegal act of unexpectedly performing a game program and an unpleasant act of performing the excessive harassing behavior, etc.

A seventh aspect is according to the sixth aspect, and the communication game processor refuses participation itself in the communication game when a value based on the restriction information is equal to or more than a predetermined value. For example, in a case that it is determined that the player frequently performs an illegal act and an unpleasant act, the player is made not to participate in the communication game.

According to the seventh aspect, the player who frequently performs the illegal act and the unpleasant act is made not to participate in the communication game, and therefore, it is possible to prevent the acts before they occur.

An eighth aspect is according to the first aspect, and the refusal of a continuation of the communication game includes a disconnection during the communication game. For example, when other game apparatus which is communicating ends the communication game halfway and the communication during the communication game by turning the power off or by forcibly disconnecting the communication, it is determined that the continuation of the communication game is refused.

According to the eighth aspect, in a case that the game is ended halfway, it is possible to update the restriction information by determining that an illegal act of unexpectedly using the game program and an unpleasant act of performing an excessive harassing behavior, etc. are performed.

A ninth aspect is according to the eighth aspect, wherein the refusal determiner determines that the one game apparatus is refused to continue the communication game by the other game apparatus when communication data from the other game apparatus is not received by the one game apparatus for a predetermined time.

According to the ninth aspect, in a case that communication data from the other game apparatus is not received for a predetermined time, it is determined that the continuation of the communication game is refused, and therefore, it is possible to indirectly detect that the game apparatus is powered off, or the communication is forcibly disconnected.

A tenth aspect is according to the first aspect, wherein a refusal of continuation of the communication game includes a refusal of participation in a next communication game.

According to the tenth aspect, in a case that participation in the next communication game is refused as well, it is possible to update the restriction information by determining that an illegal act of unexpectedly using the game program and an unpleasant act of performing an excessive harassing behavior, etc. are performed in the immediately preceding communication game.

An eleventh aspect is according to the first aspect, and a game system further comprises a refusal information updater. The refusal information updater updates refusal information indicating the number of times that the other game apparatus refuses to continue the communication game. The restriction information updater further updates the restriction information as to the communication game of the one game apparatus on the basis of the refusal information updated by the refusal information updater.

According to the eleventh aspect, the number of times that the other game apparatus refuses is added when the restriction information of the one game apparatus is updated, and therefore, it is possible to prevent an act of intentionally updating the restriction information of the other game apparatus from occurring.

A twelfth aspect is according to the eleventh aspect, wherein the restriction information updater makes the degree of change in the restriction information small as the number indicated by the refusal information updated by the refusal information updater is large.

According to the twelfth aspect, as to the other game apparatus which frequently refuses to continue the communication game, for example, it is possible to make an influence given to the update of the restriction information of the one game apparatus less.

A thirteenth aspect is according to the first aspect, and a game system further comprises a refusal number detector which detects the number of other game apparatuses that refuses to continue the communication game. The restriction information updater further updates the restriction information as to the communication game of the one game apparatus on the basis of a detection result by the refusal number detector.

According to the thirteenth aspect, depending on the number of other game apparatuses that refuses the continuation of the game, the restriction information is updated. Thus, the restriction information of the one game apparatus that is refused to perform the communication game by a plurality of other game apparatuses at a time can be drastically changed, for example.

A fourteenth aspect is according to the first aspect, and a game system further comprises a participant register and a re-participating acceptor. The participant register registers the game apparatus which participates in the communication game as a participant at a start of the communication game. The re-participating acceptor accepts an instruction as to whether to participate in the communication game again or not is accepted from the participant at an end of the communication game. The refusal determiner determines whether or not there is the game apparatus which is refused to continue the communication game on the basis of the instruction accepted by the re-participating acceptor.

According to the fourteenth aspect, the participants in the communication game are registered, and an instruction as to whether to participate in the communication game again or not is accepted at the end of the communication game, and therefore, it is easily know whether or not the continuation of the communication game is refused.

A fifteenth aspect is according to the fourteenth aspect, and the game system further comprises a difference acquirer and a difference determiner. The difference acquirer acquires a difference between the number of participants in a previous communication game and the number of participants in a next communication game. The difference determiner determines whether or not the difference acquired by the difference acquirer satisfies a predetermined condition. The refusal determiner determines to be the game apparatus which is refused to continue the communication game when the difference determiner determines that the difference does not satisfy the predetermined condition.

According to the fifteenth aspect, only when the difference between the number of participants in the previous communication game and the number of participants in the next communication game satisfies the predetermined condition, the game apparatus which is refused to continue the communication game is determined, and therefore, the restriction information can be updated only in this case.

A sixteenth aspect is a storage medium storing a game program of a game system performing a communication game, and the game program causes a computer of the game system to function as: a refusal determiner which determines whether or not one game apparatus is refused to continue the communication game by other game apparatus, and a restriction information updater which updates restriction information as to the communication game of the one game apparatus in correspondence with a determination result by the refusal determiner.

A seventeenth aspect is a game controlling method causing a computer of a game system to perform a communication game, including steps of: (a) determining whether or not one game apparatus is refused to continue the communication game by other game apparatus, and (b) updating restriction information as to the communication game of the one game apparatus in correspondence with a determination result by the step (a).

In the sixteenth and seventeenth aspects as well, similar to the first aspect, it is possible to reduce and avoid an illegal act of unexpectedly using the game program and an unpleasant act of performing excessive harassing behavior, etc.

The above described objects and other objects, features, aspects, and advantages of certain example embodiments will become more apparent from the following detailed description when taken in conjunction with the accompanying drawings.

BRIEF DESCRIPTION OF THE DRAWINGS

FIG. 6 is an illustrative view showing a specific example of a currently-participating player list;

DETAILED DESCRIPTION OF THE PREFERRED EMBODIMENTS

First Embodiment

Figure 1:
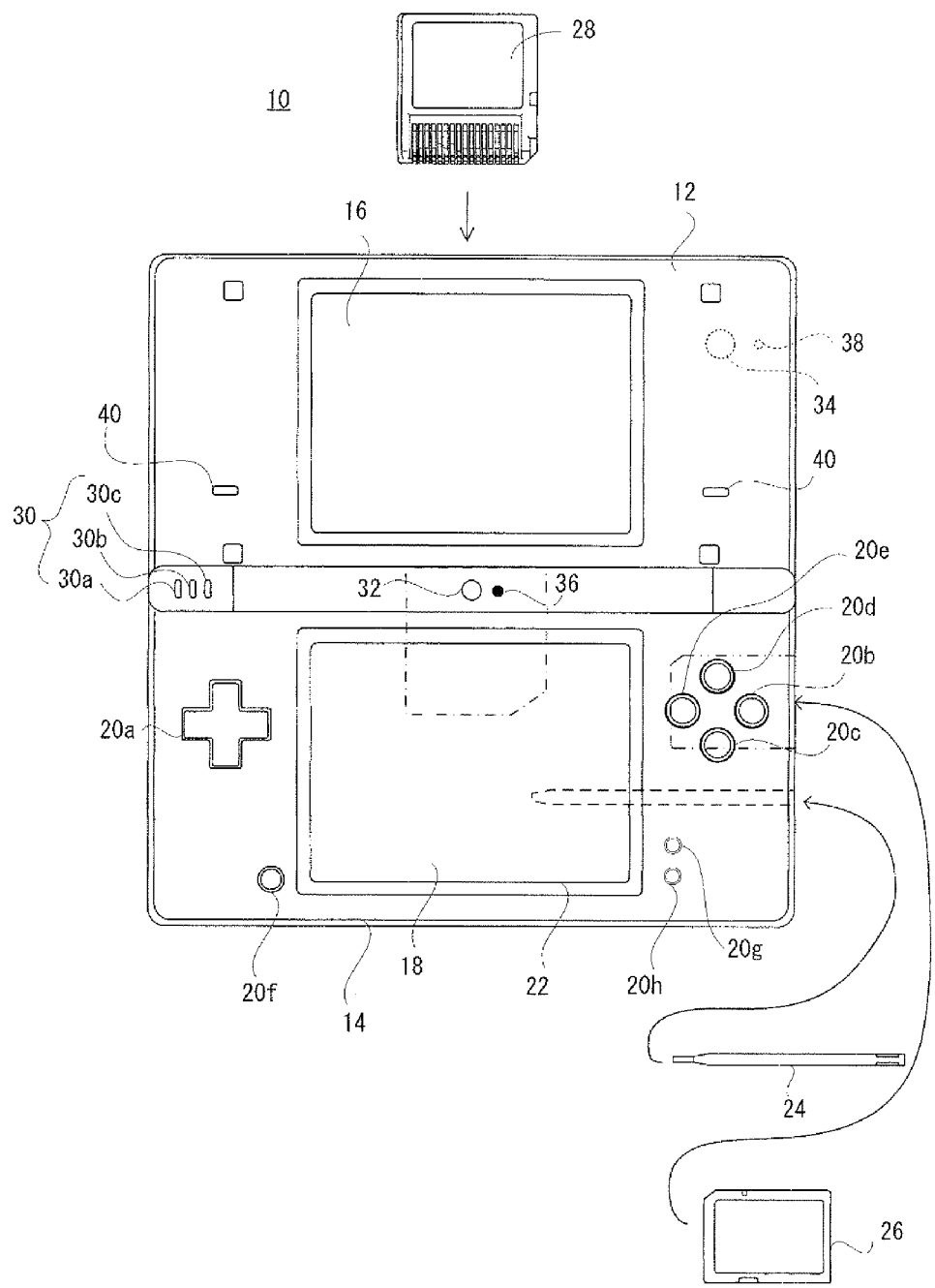
FIG. 1 is an illustrative view showing one embodiment of an external configuration of a game apparatus.

Referring to FIG. 1, a game apparatus 10 of a first embodiment includes an upper housing 12 and a lower housing 14, and the upper housing 12 and the lower housing 14 are connected with each other so as to be opened or closed (foldable). In FIG. 1 example, the upper housing 12 and the lower housing 14 are constructed in the form of a horizontally long rectangular plate, and are rotatably connected with each other at the long sides of both of the housings. That is, the game apparatus 10 of the first embodiment is a folding hand-held game apparatus, and in FIG. 1, the game apparatus 10 is shown in an opened state (in an open state). The game apparatus 10 is constructed in such a size that the user can hold with both hands or one hand even in the open state.

Generally, the user uses the game apparatus 10 in the open state. Furthermore, the user keeps the game apparatus 10 in a close state when not using the game apparatus 10. Here, the game apparatus 10 can maintain an opening and closing angle formed between the upper housing 12 and the lower housing 14 at an arbitrary angle between the close state and open state by a friction force, etc. exerted at the connected portion as well as the aforementioned close state and open state. That is, the upper housing 12 can be fixed with respect to the lower housing 14 at the arbitrary angle.

Additionally, the game apparatus 10 is mounted with a camera (32, 34) described later, functioning as an imaging device, such as imaging an image with the camera (32, 34), displaying the imaged image on the screen, and saving the imaged image data.

As shown in FIG. 1, the upper housing 12 is provided with a first LCD 16, and the lower housing 14 is provided with a second LCD 18. The first LCD 16 and the second LCD 18 take a horizontally-long shape, and are arranged such that the directions of the long sides thereof are coincident with the long sides of the upper housing 12 and the lower housing 14. For example, resolutions of the first LCD 16 and the second LCD 18 are set to 256 (horizontal)×192 (vertical) pixels (dots).

In addition, although an LCD is utilized as a display in the first embodiment, an EL (Electronic Luminescence) display, a plasmatic display, etc. may be used in place of the LCD. Furthermore, the game apparatus 10 can utilize a display with an arbitrary resolution.

Figure 2:
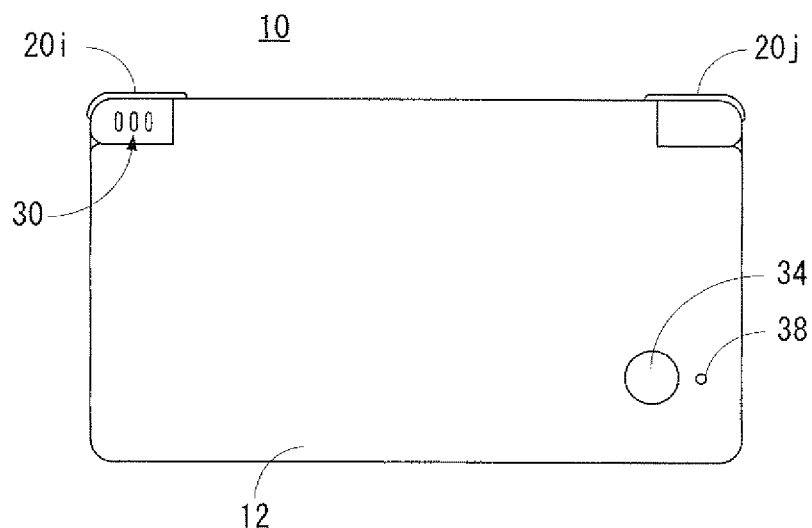
FIG. 2 is an illustrative view showing a top view and a left side surface in a state that the game apparatus shown in FIG. 1 is folded.
Figure 2:
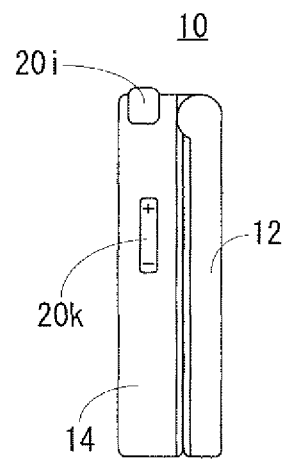

As shown in FIG. 1 and FIG. 2, the lower housing 14 is provided with respective operation buttons 20a-20k as input devices. Out of the respective operation buttons 20a-20k, the direction input button 20a, the operation button 20b, the operation button 20c, the operation button 20d, the operation button 20e, the power button 20f, the start button 20g, and the select button 20h are provided on the surface (inward surface) to which the second LCD 18 of the lower housing 14 is set. More specifically, the direction input button 20a and the power button 20f are arranged at the left of the second LCD 18, and the operation buttons 20b-20e, 20g and 20h are arranged at the right of the second LCD 18. Furthermore, when the upper housing 12 and the lower housing 14 are folded, the operation buttons 20a-20h are enclosed within the game apparatus 10.

The direction input button (cross key) 20a functions as a digital joystick, and is used for instructing a moving direction of a player object, moving a cursor, and so forth. Each operation buttons 20b-20e is a push button, and is used for causing the player object to make an arbitrary action, executing a decision and cancellation, and so forth. The power button 20f is a push button, and is used for turning on or off the main power supply of the game apparatus 10. The start button 20g is a push button, and is used for temporarily stopping (pausing), starting (restarting) a game, and so forth. The select button 20h is a push button, and is used for a game mode selection, a menu selection, etc.

Although operation buttons 20i-20k are omitted in FIG. 1, as shown in FIG. 2 (A), the operation button (L button) 20i is provided at the left corner of the upper side surface of the lower housing 14, and the operation button (R button) 20j is provided at the right corner of the upper side surface of the lower housing 14. Furthermore, as shown in FIG. 2 (B), the volume button 20k is provided on the left side surface of the lower housing 14.

FIG. 2 (A) is an illustrative view of the game apparatus 10 in a folded manner as seen from a top surface (upper housing 12). FIG. 2 (B) is an illustrative view of the game apparatus 10 in a folded manner when seen from a left side surface.

The L button 20i and the R button 20j are push buttons, and can be used for similar operations to those of the operation buttons 20b-20e, and can be used as subsidiary operations of these operation buttons 20b-20e. Furthermore, in the first embodiment, the L button 20i and the R button 20j can be also used for an operation of an imaging instruction (shutter operation). The volume button 20k is made up of two push buttons, and is utilized for adjusting the volume of the sound output from two speakers (right speaker and left speaker) not shown. In the first embodiment, the volume button 20k is provided with an operating portion including two push portions, and the aforementioned push buttons are provided by being brought into correspondence with the respective push portions. Thus, when the one push portion is pushed, the volume is made high, and when the other push portion is pushed, the volume is made low. For example, when the push portion is hold down, the volume is gradually made high, or the volume is gradually made low.

Returning to FIG. 1, the game apparatus 10 is further provided with a touch panel 22 as an input device separate from the operation buttons 20a-20k. The touch panel 22 is attached so as to cover the screen of the second LCD 18. In the first embodiment, a touch panel of a resistance film system is used as the touch panel 22, for example. However, the touch panel 22 can employ an arbitrary push-type touch panel without being restricted to the resistance film system. Furthermore, in the first embodiment, as the touch panel 22, a touch panel having the same resolution (detection accuracy) as the resolution of the second LCD 18, for example, is utilized. However, the resolution of the touch panel 22 and the resolution of the second LCD 18 are not necessarily coincident with each other.

Additionally, at the right side surface of the lower housing 14, a loading slot (represented by a dashed line shown in FIG. 1) is provided. The loading slot can house a touch pen 24 to be utilized for performing an operation on the touch panel 22. Generally, an input with respect to the touch panel 22 is performed with the touch pen 24, but it may be performed with a finger of the user beyond the touch pen 24. Accordingly, in a case that the touch pen 24 is not to be utilized, the loading slot and the housing portion for the touch pen 24 need not be provided.

Moreover, on the right side surface of the lower housing 14, a loading slot for housing a memory card 26 (represented by a chain double-dashed line in FIG. 1) is provided. Inside of the loading slot, a connector (not illustrated) for electrically connecting the game apparatus 10 and the memory card 26 is provided. The memory card 26 is an SD card, for example, and detachably attached to the connector. This memory card 26 is used for storing (saving) an image imaged by the game apparatus 10, and reading the image generated (imaged) or stored by another apparatus in the game apparatus 10.

In addition, on the upper side surface of the lower housing 14, a loading slot (represented by an alternate long and short dash line FIG. 1) for housing a memory card 28 is provided. Inside the loading slot as well, a connector (not illustrated) for electrically connecting the game apparatus 10 and the memory card 28 is provided. The memory card 28 is a recording medium of recording an information processing program, necessary data, etc. and is detachably attached to the loading slot provided to the lower housing 14.

At the left end of the connected portion (hinge) between the upper housing 12 and the lower housing 14, an indicator 30 is provided. The indicator 30 is made up of three LEDs 30a, 30b, 30c. Here, the game apparatus 10 can make a wireless communication with another appliance, and the first LED 30a lights up when a wireless communication with the appliance is established. The second LED 30b lights up while the game apparatus 10 is recharged. The third LED 30c lights up when the main power supply of the game apparatus 10 is turned on. Thus, by the indicator 30 (LEDs 30a-30c), it is possible to inform the user of a communication-established state, a charge state, and a main power supply on/off state of the game apparatus 10.

As described above, the upper housing 12 is provided with the first LCD 16. In the first embodiment, the touch panel 22 is set so as to cover the second LCD 18, but the touch panel 22 may be set so as to cover the first LCD 16. Alternatively, two touch panels 22 may be set so as to cover the first LCD 16 and the second LCD 18. For example, on the second LCD 18, an operation explanatory screen for teaching the user how the respective operation buttons 20a-20k and the touch panel 22 work or how to operate them and a game screen are displayed.

Additionally, the upper housing 12 is provided with the two cameras (inward camera 32 and outward camera 34). As shown in FIG. 1, the inward camera 32 is attached in the vicinity of the connected portion between the upper housing 12 and the lower housing 14 and on the surface to which the first LCD 16 is provided such that the display surface of the first LCD 16 and the imaging surface are in parallel with each other or are leveled off. On the other hand, the outward camera 34 is attached to the surface being opposed to the surface to which the inward camera 32 is provided as shown in FIG. 2 (A), that is, on the outer surface of the upper housing 12 (the surface turns to the outside when the game apparatus 10 is in a close state, and on the back surface of the upper housing 12 shown in FIG. 1). Here, in FIG. 1, the outward camera 34 is shown by a dashed line.

Accordingly, the inward camera 32 can image a direction to which the inner surface of the upper housing 12 is turned, and the outward camera 34 can image a direction opposite to the imaging direction of the inward camera 32, that is, can image a direction to which the outer surface of the upper housing 12 is turned. Thus, in the first embodiment, the two cameras 32, 34 are provided such that the imaging directions of the inward camera 32 and the outward camera 34 are opposite with each other. For example, the user holding the game apparatus 10 can image a landscape (including the user, for example) as the user is seen from the game apparatus 10 with the inward camera 32, and can image a landscape as the direction opposite to the user is seen from the game apparatus 10 with the outward camera 34.

Additionally, on the internal surface near the aforementioned connected portion, a microphone 84 (see FIG. 3) is housed as a voice input device. Then, on the internal surface near the aforementioned connected portion, a through hole 36 for the microphone 84 is formed so as to detect a sound outside the game apparatus 10. The position for housing the microphone 84 and the position of the through hole 36 for the microphone 84 are not necessarily on the aforementioned connected portion, and the microphone 84 may be housed in the lower housing 14, and the through hole 36 for the microphone 84 may be provided to the lower housing 14 in correspondence with the housing position of the microphone 84.

Furthermore, on the outer surface of the upper housing 12, in the vicinity of the outward camera 34, a fourth LED 38 (dashed line in FIG. 1) is attached. The fourth LED 38 lights up at a time when an imaging is made with the inward camera 32 or the outward camera 34 (shutter button is pushed). Furthermore, in a case that a motion image is imaged with the inward camera 32 or the outward camera 34, the fourth LED 38 continues to light up during the imaging. That is, by making the fourth LED 38 light up, it is possible to inform an object to be imaged or his or her surrounding that an imaging with the game apparatus 10 is made (is being made).

Moreover, the upper housing 12 is formed with a sound release hole 40 on both sides of the first LCD 16. The above-described speaker is housed at a position corresponding to the sound release hole 40 inside the upper housing 12. The sound release hole 40 is a through hole for releasing the sound from the speaker to the outside of the game apparatus 10.

As described above, the upper housing 12 is provided with the inward camera 32 and the outward camera 34 which are constituted to image an image, and the first LCD 16 as a displayer for mainly displaying the imaged image and a game screen. On the other hand, the lower housing 14 is provided with the input device (operation button 20 (20a-20k) and the touch panel 22) for performing an operation input to the game apparatus 10 and the second LCD 18 as a displayer for mainly displaying an operation explanatory screen and a game screen. Accordingly, the game apparatus 10 has two screens (16, 18) and two kinds of operating portions (20, 22).

Figure 3:
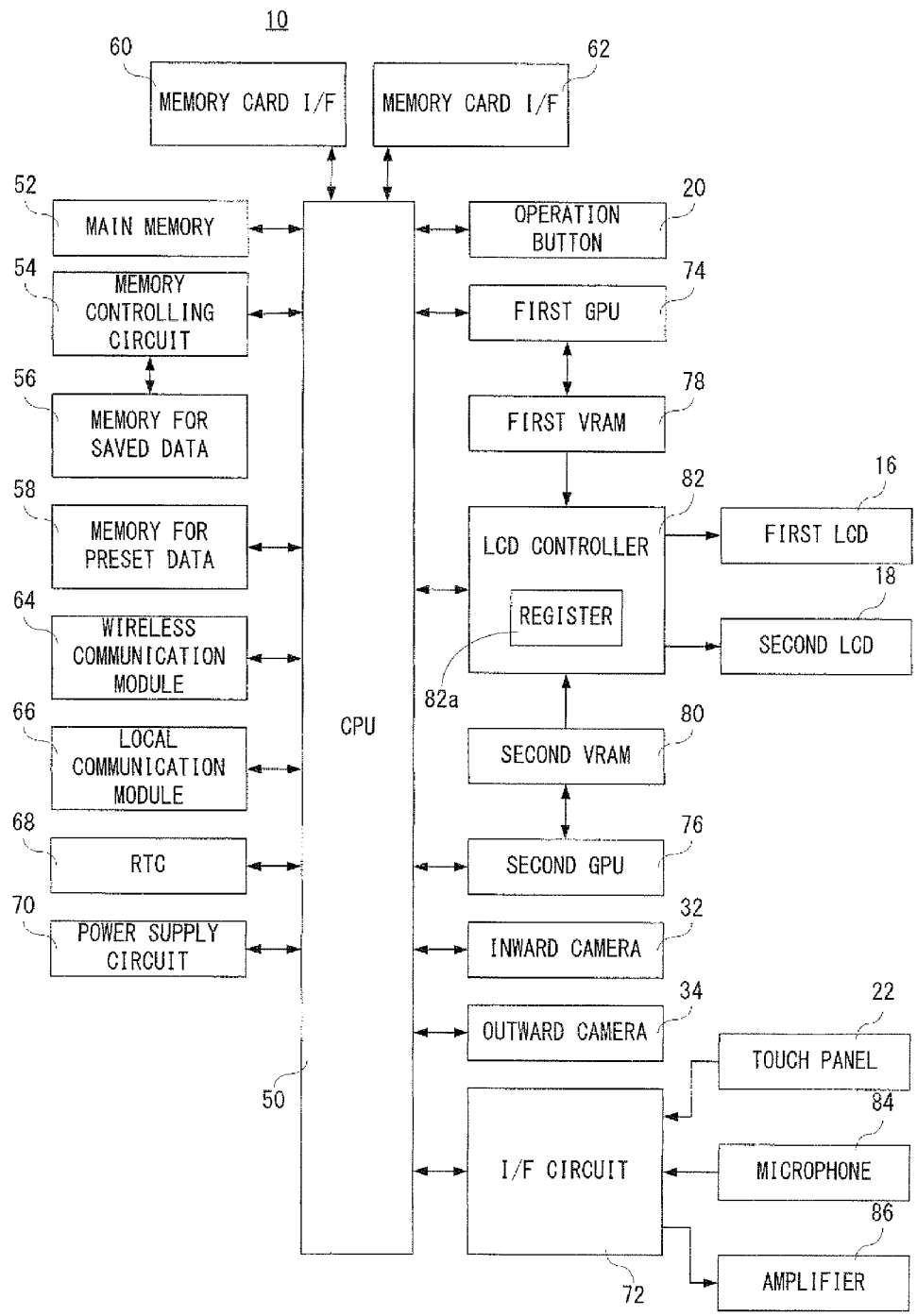
FIG. 3 is a block diagram showing an electric configuration of the game apparatus shown in FIG. 1 and FIG. 2.

FIG. 3 is a block diagram showing an electric configuration of the game apparatus 10 of the first embodiment. As shown in FIG. 3, the game apparatus 10 includes electronic components, such as a CPU 50, a main memory 52, a memory controlling circuit 54, a memory for saved data 56, a memory for preset data 58, a memory card interface (memory card I/F) 60, a memory card I/F 62, a wireless communication module 64, a local communication module 66, a real time clock (RTC) 68, a power supply circuit 70, an interface circuit (I/F circuit) 72, a first GPU (Graphics Processing Unit) 74, a second GPU 76, a first VRAM (Video RAM) 78, a second VRAM 80, an LCD controller 82, etc. These electronic components (circuit components) are mounted on an electronic circuit board, and housed in the lower housing 14 (or the upper housing 12 may also be appropriate).

The CPU 50 is an information processing means for executing a predetermined program. In the first embodiment, the predetermined program is stored in a memory (memory for saved data 56, for example) within the game apparatus 10 and the memory card 26 and/or 28, and the CPU 50 executes information processing described later by executing the predetermined program.

Here, the program to be executed by the CPU 50 may be previously stored in the memory within the game apparatus 10, acquired from the memory card 26 and/or 28, and acquired from another appliance by communicating with this another appliance.

The CPU 50 is connected with the main memory 52, the memory controlling circuit 54, and the memory for preset data 58. The memory controlling circuit 54 is connected with the memory for saved data 56. The main memory 52 is a memory means to be utilized as a work area and a buffer area of the CPU 50. That is, the main memory 52 stores (temporarily stores) various data to be utilized in the aforementioned information processing, and stores a program from the outside (memory cards 26 and 28, and another appliance). In the first embodiment, as a main memory 52, a PSRAM (Pseudo-SRAM) is used, for example. The memory for saved data 56 is a memory means for storing (saving) a program to be executed by the CPU 50, data of an image imaged by the inward camera 32 and the outward camera 34, etc. The memory for saved data 56 is constructed by a nonvolatile storage medium, and can utilize a NAND type flash memory, for example. The memory controlling circuit 54 controls reading and writing from and to the memory for saved data 56 according to an instruction from the CPU 50. The memory for preset data 58 is a memory means for storing data (preset data), such as various parameters, etc. which are previously set in the game apparatus 10. As a memory for preset data 58, a flash memory to be connected to the CPU 50 by a SPI (Serial Peripheral Interface) bus can be utilized.

Both of the memory card I/Fs 60 and 62 are connected to the CPU 50. The memory card I/F 60 performs reading and writing data from and to the memory card 26 attached to the connector according to an instruction form the CPU 50. Furthermore, the memory card I/F 62 performs reading and writing data from and to the memory card 28 attached to the connector according to an instruction form the CPU 50. In the first embodiment, image data corresponding to the image imaged by the inward camera 32 and the outward camera 34 and image data received by other devices are written to the memory card 26, and the image data stored in the memory card 26 is read from the memory card 26 to be stored in the memory for saved data 56, and sent to other devices. Furthermore, the various programs stored in the memory card 28 are read by the CPU 50 so as to be executed.

Here, the information processing program such as a game program is not only supplied to the game apparatus 10 through the external storage medium, such as a memory card 28, etc. but also is supplied to the game apparatus 10 through a wired or a wireless communication line. In addition, the information processing program may be recorded in advance in a nonvolatile storage device inside the game apparatus 10. Additionally, as an information storage medium for storing the information processing program, an optical disk storage medium, such as a CD-ROM, a DVD or the like may be appropriate beyond the aforementioned nonvolatile storage device.

The wireless communication module 64 has a function of connecting to a wireless LAN according to an IEEE802.11.b/g standard-based system, for example. The local communication module 66 has a function of performing a wireless communication with the same types of the game apparatuses by a predetermined communication system. The wireless communication module 64 and the local communication module 66 are connected to the CPU 50. The CPU 50 can receive and send data over the Internet with other appliances by means of the wireless communication module 64, and can receive and send data with the same types of other game apparatuses by means of the local communication module 66.

Furthermore, the CPU 50 is connected with an RTC 68 and a power supply circuit 70. The RTC 68 counts a time to output the same to the CPU 50. For example, the CPU 50 can calculate a date, a current time, etc. on the basis of the time counted by the RTC 68. The power supply circuit 70 controls power supplied from a power source (typically a battery housed in the lower housing 14) belonging to the game apparatus 10 to supply the power to each of the circuit components of the game apparatus 10.

Also, the game apparatus 10 includes the microphone 84 and an amplifier 86. Both of the microphone 84 and the amplifier 86 are connected to the I/F circuit 72. The microphone 84 detects a voice and a sound (clap and handclap, etc.) of the user produced or generated toward the game apparatus 10, and outputs a sound signal indicating the voice or the sound to the I/F circuit 72. The amplifier 86 amplifies the sound signal applied from the I/F circuit 72, and applies the amplified signal to the speaker (not illustrated). The I/F circuit 72 is connected to the CPU 50.

The touch panel 22 is connected to the I/F circuit 72. The I/F circuit 72 includes a sound controlling circuit for controlling the microphone 84 and the amplifier 86 (speaker), and a touch panel controlling circuit for controlling the touch panel 22. The sound controlling circuit performs an A/D conversion and a D/A conversion on a sound signal, or converts a sound signal into sound data in a predetermined format. The touch panel controlling circuit generates touch position data in a predetermined format on the basis of a signal from the touch panel 22 and outputs the same to the CPU 50. For example, the touch position data is data indicating coordinates of a position where an input is performed on an input surface of the touch panel 22.

Additionally, the touch panel controlling circuit performs reading of a signal from the touch panel 22 and generation of the touch position data per each predetermined time. By fetching the touch position data via the I/F circuit 72, the CPU 50 can know the position on the touch panel 22 where an input is made.

The operation button 20 is made up of the aforementioned respective operation buttons 20a-20k, and is connected to the CPU 50. The operation data indicating an input state (whether or not to be pushed) with respect to each of the operation buttons 20a-20k is output from the operation button 20 to the CPU 50. The CPU 50 acquires the operation data from the operation button 20, and executes processing according to the acquired operation data.

Both of the inward camera 32 and the outward camera 34 are connected to the CPU 50. The inward camera 32 and the outward camera 34 image images according to instructions from the CPU 50, and output image data corresponding to the imaged images to the CPU 50. In the first embodiment, the CPU 50 issues an imaging instruction to any one of the inward camera 32 and the outward camera 34 while the camera (32, 34) which has received the imaging instruction images an image and transmits the image data to the CPU 50.

The first GPU 74 is connected with the first VRAM 78, and the second GPU 76 is connected with the second VRAM 80. The first GPU 74 generates a first display image on the basis of data for generating the display image stored in the main memory 52 according to an instruction from the CPU 50, and draws the same in the first VRAM 78. The second GPU 76 similarly generates a second display image according to an instruction form the CPU 50, and draws the same in the second VRAM 80. The first VRAM 78 and the second VRAM 80 are connected to the LCD controller 82.

The LCD controller 82 includes a register 82a. The register 82a stores a value of "0" or "1" according to an instruction from the CPU 50. In a case that the value of the register 82a is "0", the LCD controller 82 outputs the first display image drawn in the first VRAM 78 to the second LCD 18, and outputs the second display image drawn in the second VRAM 80 to the first LCD 16. Furthermore, in a case that the value of the register 82a is "1", the LCD controller 82 outputs the first display image drawn in the first VRAM 78 to the first LCD 16, and outputs the second display image drawn in the second VRAM 80 to the second LCD 18.

Figure 4:
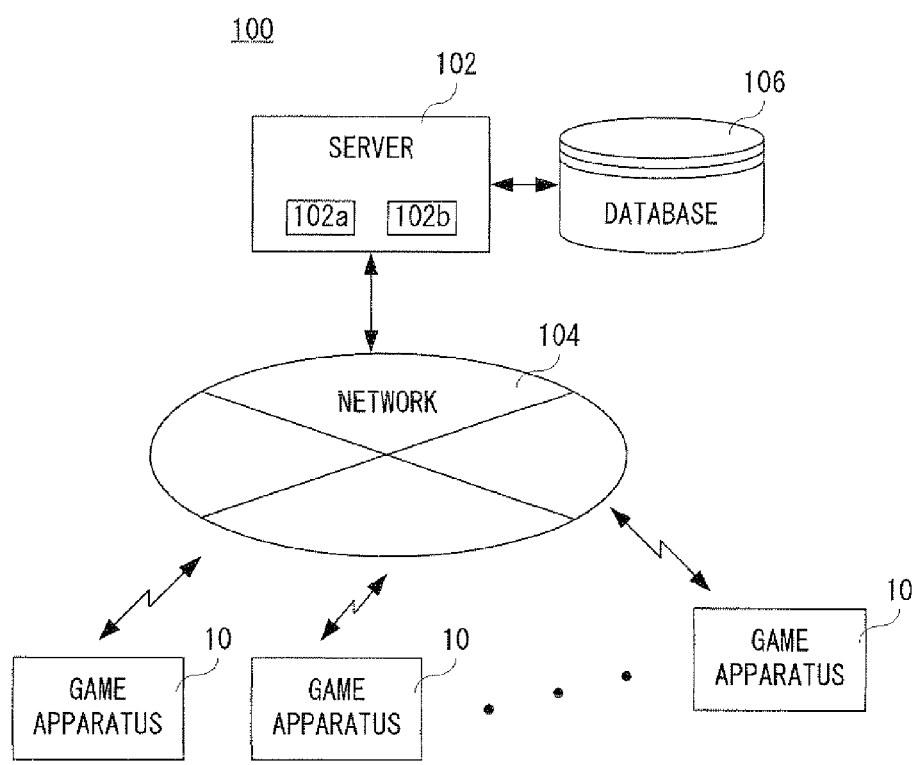
FIG. 4 is an illustrative view showing an example of a game system utilizing the game apparatus shown in FIG. 1 to FIG. 3.

FIG. 4 is an illustrative view showing one example of the game system 100 utilizing the game apparatus 10 shown in FIG. 1 to FIG. 3. As shown in FIG. 4, the game system 100 includes a server 102, and the server 102 can communicate with and is connected to a plurality of game apparatuses 10 via a network 104, such as the Internet or a LAN. Furthermore, the server 102 is directly connected to a database 106. Here, the database 106 may be connected to the server 102 via the network 104. The server 102 is a general-purpose server, and includes components, such as a CPU 102a, a RAM 102b, etc.

For example, in the game system 100 as shown in FIG. 4, the server 102 accepts an application for participation in a communication game from the game apparatus 10. For example, the communication game is a virtual game in which a plurality of game apparatuses 10 (players) battle or compete with one another (hereinafter simply referred to as "battle"). Alternatively, the communication game may be a virtual game in which the plurality of game apparatuses 10 (players) cooperate to do battles and adventures. When accepting an application for participation in the communication game from the game apparatus 10, the server 102 decides (matches) a player being an opponent of the communication game, that is, a prospective participant in the communication game. At this time, a plurality of groups may sometimes be formed, but in the first embodiment, one group shall be formed for simplicity. When a group of prospective participants is decided, the server 102 transmits connection information (IP address, for example,) as to the game apparatuses 10 of the other prospective participants to each of the game apparatus 10 as a prospective participant.

When receiving an IP address transmitted from the server 102, each game apparatus 10 establishes a connected state (begins the communication) with the game apparatus 10 of another prospective participant on the basis of the received IP address, and starts the communication game. At this time, the game apparatus 10 with which the connected state is established is decided as a participant in the communication game, that is, an opponent. Here, the game apparatus 10 with which the connection is not established is determined not to participate in the current communication game.

During execution of the communication game, each game apparatus 10 executes game processing on the basis of operation data (own operation data) input by his or her own player and operation data (other operation data) transmitted from the game apparatus 10 of an opponent (other participants). For example, a position and a motion of each player character are controlled to update the game screen and output a sound (music) required for the game. Furthermore, scoring processing (may get point off) is executed in correspondence with the progress of the communication game. When ending the communication game, each game apparatus 10 transmits a notification of ending the communication game (end notification) to the server 102.

Additionally, in the first embodiment, operation data is transmitted and received between respective game apparatuses 10, but data of a result by the operation (result data) may be transmitted and received. For example, which is transmitted and received, the operation data or the result data, is selectively decided depending on the kind and the design of the communication game.

Furthermore, although detailed explanation is omitted, when the communication game is ended, as to each game apparatus 10, the player is inquired about whether or not the communication game is performed with the same opponent again (successively), and the communication game is executed among the game apparatuses 10 whose players select to execute the communication game again. That is, the communication game is successively performed.

In such a communication game, for example, a player of a certain game apparatus 10 who falls into a disadvantageous condition sometimes makes the communication game (battle) invalid by forcibly ending the communication game, and forcibly disconnecting the communication itself. In such a case, it is considered that if any penalty is imposed on the player who forcibly disconnects the communication game and the communication itself, such actions can be reduced.

However, even if any penalty is imposed on the player who forcibly disconnects the communication game and the communication itself, it is difficult to avoid an illegal act of advantageously advancing the communication game by remodeling (modifying) the game software (game program) and by using the game program in an unexpected processing, and an unpleasant act of performing an excessive harassing behavior to the opponent, etc. Especially, such an illegal act and an unpleasant act have increased in recent years, and an effective measure therefor has been required.

Thereupon, in the first embodiment, the player who is ended halfway of the communication game (premature ending) or is refused to participate in a next communication game, that is, the player who is refused to continue the communication game is indirectly detected as a person who makes the aforementioned illegal act and unpleasant act, and the player is made impossible to participate in the communication game from the next time onward and is made to play in a disadvantageous situation in the next communication game onward.

In the first embodiment, the premature ending means that the power of the game apparatus 10 is turned off, or the communication is forcibly ended during execution of the communication game. Here, even if the player does not disconnect the communication intentionally, the communication may be disconnected due to deterioration of the communication environment.

That is, in the first embodiment, that a game apparatus is ended halfway of the communication game and is refused to participate in a next communication game is based on the fact that a player who prematurely ends the communication game, and refuses to make the game apparatus participate in the next communication game suffered the aforementioned illegal act and unpleasant act from the opponent.

However, by turning this to the advantage, in order to trap a certain player, the player who does not perform an illegal act and an unpleasant act in fact can be made up as a player who actually performs the acts by intentionally prematurely ending the communication game, and refusing the participation in a next communication game. Thus, as to the player (game apparatus 10) who frequently prematurely ends the communication game and frequently refuses to participate in the next communication game, an influence given to a score (bad reputation score) as to a bad reputation of the player based on the illegal act and the unpleasant act is made less as described later.

Figure 5:
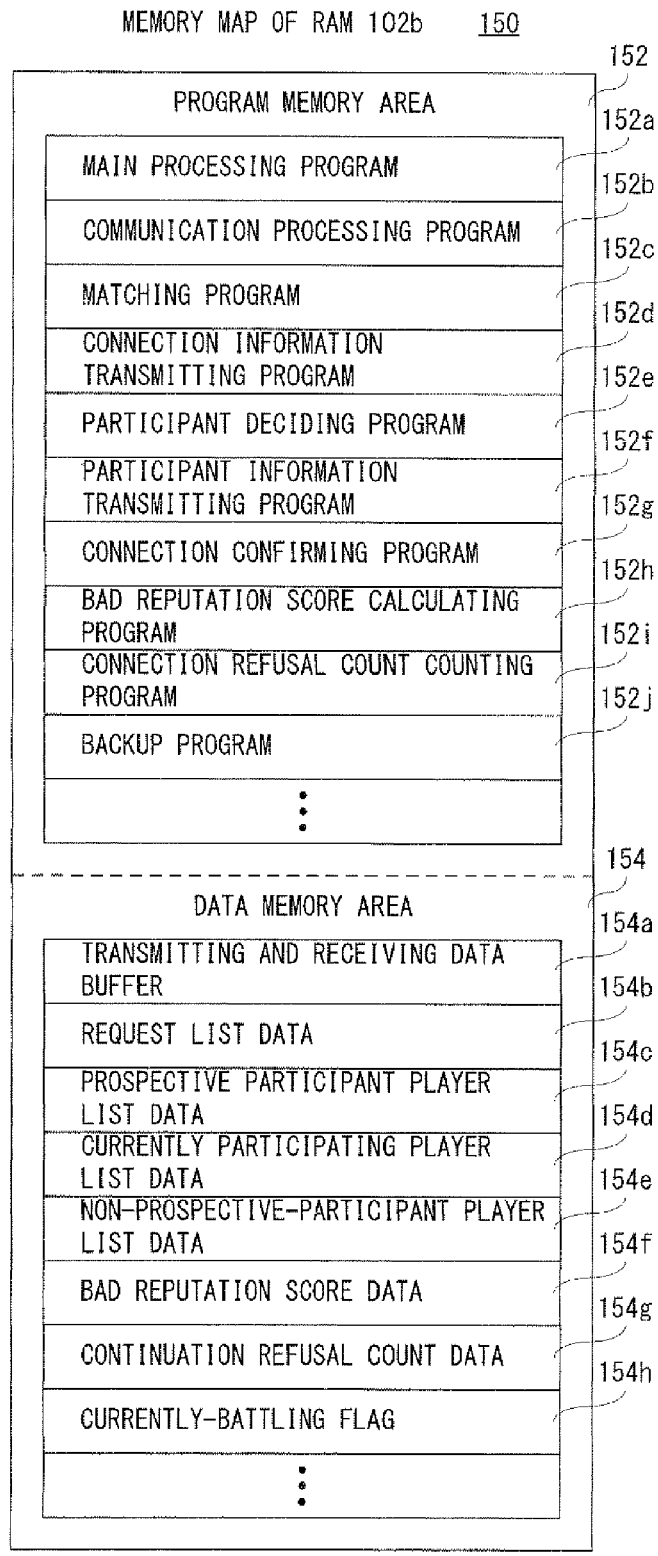
FIG. 5 is an illustrative view showing a memory map of a RAM of a server shown in FIG. 4.

FIG. 5 is an illustrative view showing an example of a memory map 150 of a RAM 102b contained in the server 102. As shown in FIG. 5, the RAM 102b includes a program memory area 152 and a data memory area 154. In the program memory area 152, a main processing program 152a, a communication processing program 152b, a matching program 152c, a connection information transmitting program 152d, a participant deciding program 152e, a participant information transmitting program 152f, a connection confirming program 152g, a bad reputation score calculating program 152h, a connection refusal count counting program 152i, a backup program 152j, etc. are stored.

The main processing program 152a is a program for processing a main routine to execute the communication game of the first embodiment among the game apparatuses 10. The communication processing program 152b is a program for performing communication processing with the game apparatuses 10. The matching program 152c is for deciding (matching) the game apparatus 10 of a prospective participant being an opponent of the communication game out of the plurality of game apparatuses 10 which make applications for participation in the communication game. In this embodiment, the matching program 152c reads a bad reputation score as to the game apparatus 10 (player) from the database 106, and decides the game apparatuses 10 having the same or the same level of a bad reputation score as prospective participants.

The connection information transmitting program 152d is a program for transmitting to the game apparatus 10 of each prospective participant the connection information (IP address) of the game apparatuses 10 of the other prospective participants. The participant deciding program 152e is a program for deciding the participant in the communication game. More specifically, the CPU 102a of the server 102 decides as a participant in the communication game the game apparatus 10 which transmits a start notification within a predetermined time (30 seconds, for example) from when connection information of the game apparatuses 10 of other prospective participants are transmitted to the game apparatus 10 of each prospective participant. It should be noted that the CPU 102a determines the game apparatus 10 which does not transmitted the start notification within the aforementioned predetermined time as not participating in the current communication game.

The participant information transmitting program 152f is a program for transmitting an identification information list of the game apparatus 10 of the decided participant (participant information) to the game apparatuses 10 of the participant. The connection confirming program 152g is a program for receiving a currently-connecting message transmitted from the game apparatus 10 that is participating, transmitting, when currently-connecting messages are received from all the participants, data indicating it (all participant connecting data) to the game apparatus 10 of the participants, and transmitting, in a case that currently-connecting messages are received from a part of the participants, data as to a total number of the game apparatuses 10 which makes disconnection (disconnection count data) to the game apparatus 10 of the participants (that is participating).

The bad reputation score calculating program 152h is a program for updating a bad reputation score as to the player (game apparatus 10) who is ended halfway of the communication game, and is refused to continue the next communication game. The continuation refusal count counting program 152i is a program for counting the number of times that a continuation of the communication game is refused for each player (game apparatus 10) (the number of refusals of continuation). In the first embodiment, the number of refusals of continuation indicated by continuation refusal count data 154g described later is counted up. The backup program 152j is a program for storing the data stored in the RAM 102b in the database 106 and another external storage medium (memory card, etc.). In the first embodiment, in correspondence with identification information of each player, that is, each game apparatus 10, bad reputation score data 154f, continuation refusal count data 154g and currently-battling flag 154h that are described later are stored mainly in the database 106.

Although illustration is omitted, in the program memory area, other programs, such as an image generating program, etc. are also stored. For example, the image generating program generates image data for displaying an application screen (not illustrated) when each game apparatus 10 applies for participation in the communication game.

In the data memory area 154, a transmitting and receiving data buffer 154a is provided. Furthermore, in the data memory area 154, request list data 154b, prospective participant player list data 154c, currently participating player list data 154d, non-prospective-participant player list data 154e, the bad reputation score data 154f, and the continuation refusal count data 154g are stored. In addition, in the data memory area 154, the currently-battling flag 154h is provided.

The transmitting and receiving data buffer 154a is a buffer for storing (temporarily storing) data, etc. to be transmitted to each game apparatus 10, and receiving and temporarily storing data transmitted from each game apparatus 10. The request list data 154b is data as to a list (request list) describing identification information (player name, etc.) and connection information (IP address) of the game apparatuses 10 that apply for participation in the communication game although illustration is omitted.

The prospective participant player list data 154c is a list (prospective participant player list) describing the identification information of the game apparatus 10 of the prospective participant in the communication game at the first time and the next time onward. For example, at the first time, a prospective participant is decided according to the bad reputation score indicated by the bad reputation score data 154f for each player stored in the database 106, and at the next time onward, out of the players who normally ended the immediately preceding communication game, the player who is permitted to continue the next communication game is decided as a prospective participant.

The currently participating player list data 154d is data as to the list (currently-participating player list) describing identification information of the game apparatus 10 (player) of the participant that actually participates in the communication game and information (premature ending flag) as to whether to prematurely end the communication game or not. For example, the currently-participating player list according to the currently participating player list data 154d is as shown in FIG. 6. In FIG. 6, for simplicity, the identification information of the player, that is, the game apparatus 10 is represented by one alphabetic character, but is actually inherent identification information, such as a player name, an MAC address of the wireless communication module 64 integrated in the game apparatus 10. Furthermore, the premature ending flag is a flag indicating whether or not the communication game is prematurely ended. For example, the premature ending flag is provided by being brought into correspondence with each player (game apparatus 10), and is made up of one-bit register respectively. Each premature ending flag is turned on and sets a data value of "1" to the register in a case that the corresponding player (game apparatus 10) prematurely ends the communication game. On the other hand, each premature ending flag is turned off and sets a data value of "0" to the register in a case that the corresponding player (game apparatus 10) does not prematurely end the communication game. Accordingly, in a case that the communication game is ended, the player (game apparatus 10) for which the premature ending flag is turned off means that he or she normally ends (normal end) the communication game. On the other hand, in a case that the communication game is ended, the player (game apparatus 10) for which the premature ending flag is turned on means that he or she prematurely ends the communication game.

Returning to FIG. 5, the non-prospective-participant player list data 154e is a list (non-prospective-participant player list) describing the identification information of the game apparatuses 10 that refuse to participate in the next communication game onward.

The bad reputation score data 154f is data of a bad reputation score as to each player (game apparatus 10). As described above, the bad reputation score data 154f which is backed up to the database 106, is read from the database 106 as to each game apparatus 10 that applies for participation when a prospective participant is decided (matched) after an application for participation in the communication game is accepted, and is updated in response to the communication game being executed. Here, the backup processing is executed when a predetermined event occurs, such as every predetermined period of time (30 seconds to 60 seconds, for example) to update at least the bad reputation score data 154f, the continuation refusal count data 154g described later, and the currently-battling flag 154h described later that are stored in the database 106.

The continuation refusal count data 154g is data of the number of refusals of continuation as to each player (game apparatus 10). Here, the number of refusals of continuation means the number of times that a player refuses to continue the communication game, that is, the number of times that a player prematurely ends the communication game and the number of times that a player refuses to participate in a next communication game. As described above, the continuation refusal count data 154g, which is backed up to the database 106, is read from the database 106 when participants in the communication game starts to be recruited, for example, and is updated at a time of seeking a participant in the communication game and in response to the communication game being executed.

The currently-battling flag 154h is a flag for monitoring (recording) the start and the end (normal end) of the communication game as to each player (game apparatus 10). The currently-battling flag 154h is provided by the number of game apparatuses 10 that is registered in the server 102, and each currently-battling flag 154h is made up of a one-bit register. When the currently-battling flag 154h as to a certain game apparatus 10 is turned on, a data value of "1" is set to the corresponding register. Furthermore, when the currently-battling flag 154h as to the certain game apparatus 10 is turned off, a data value of "0" is set to the corresponding register. It should be noted that when a start notification is received from the game apparatus 10, the currently-battling flag 154h as to the game apparatus 10 is turned on. On the other hand, when an end notification is received from the game apparatus 10, the currently-battling flag 154h corresponding to the game apparatus 10 is turned off. Accordingly, in a case that the game apparatus 10 prematurely ends the communication game, the end notification is not transmitted from the game apparatus 10, and thus, in such a case, the currently-battling flag 154h corresponding to the game apparatus 10 is not turned off.

Additionally, as described above, the currently-battling flag 154h is backed up to the database 106, and therefore, when a connection request is received from the game apparatus 10, the currently-battling flag 154h as to the game apparatus 10 is read from the database 106, is turned on when the game apparatus 10 starts the communication game, and is turned off when the game apparatus 10 normally ends the communication game.

Although illustration is omitted, in the data memory area 154, other data, such as image data is stored, and other flags and counters (timer) required for the processing by the server 102 are also provided.

Figure 7:
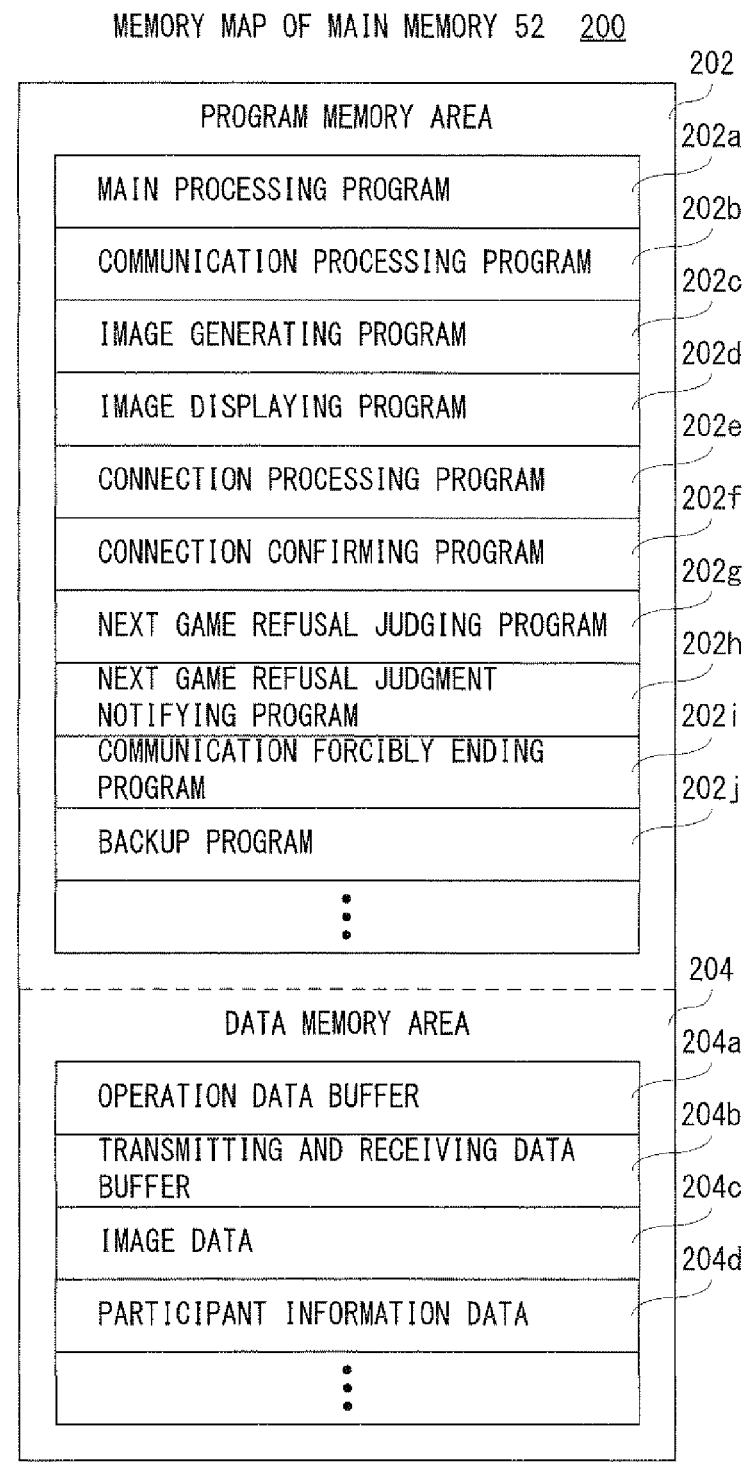
FIG. 7 is an illustrative view showing a memory map of a main memory of the game apparatus shown in FIG. 1 to FIG. 4.

FIG. 7 is an illustrative view showing an example of a memory map 200 of a main memory 52 of the game apparatus 10. As shown in FIG. 7, the main memory 52 includes a program memory area 202 and a data memory area 204. In the program memory area 202, a main processing program 202a, a communication processing program 202b, an image generating program 202c, an image displaying program 202d, a connection processing program 202e, a connection confirming program 202f, a next game refusal judging program 202g, a next game refusal judgment notifying program 202h, a communication forcibly ending program 202i and a backup program 202j are stored.

The main processing program 202a is a program for processing the main routine of the communication game. The communication processing program 202b is a program for executing a communication with another game apparatus 10 or the server 102. The image generating program 202c is a program for generating game image data corresponding to a game screen (including the menu screen and the operation screen, etc.) to be displayed on the first LCD 16 and the second LCD 18 by utilizing the image data 204c described later. The image displaying program 202d is a program for displaying the game image data generated according to the image generating program 202c on the first LCD 16 and the second LCD 18 as a game screen.

The connection processing program 202e is a program for establishing a connected state with the game apparatus 10 of another prospective participant according to the connection information (IP address) received from the server 102. The connection confirming program 202f is a program for transmitting a currently-connecting message to the server 102 during execution of the communication game, and receiving all participant connecting data or disconnection count data transmitted from the server 102.

Here, the currently-connecting message is a message indicating that the game apparatus 10 is executing the communication game, that is, is connecting with another game apparatus 10 (opponent) or the server 102 (during connection).

The next game refusal judging program 202g is a program for judging whether or not successively performing a next communication game is refused. In this embodiment, when the communication game is ended, a selection screen (not illustrated) for selecting whether game playing is performed with the same opponent again (strictly, the opponent who normally ends the communication game) is displayed on the first LCD 16 or the second LCD 18, or both of them. Here, when the player selects to play again, it is judged that successively playing the communication game is not refused (permitted). However, when the player selects to not play again (the communication game is stopped, or game playing is performed with another player, for example), it is judged that successively playing the communication game is refused.

The next game refusal judgment notifying program 202h is a program for transmitting a notification of the determination result of the next game refusal judging program 202g to the server 102. In the first embodiment, in a case that playing again is selected, a notification indicating that successively performing the communication game is permitted (continuation permitting notification) is transmitted to the server 102. However, in a case that stopping the communication game is selected, a notification indicating that successively performing the communication game is refused (continuation refusing notification) is transmitted to the server 102. Furthermore, in a case that playing the game with another player, etc. is selected, the game apparatus 10 transmits the notification of an application for participation in the communication game for playing with another player to the server 102.

The communication forcibly ending program 202*i* is a program for forcibly ending the communication or the communication game. In this embodiment, in a case that the game apparatus 10 applies for participation in the communication game to the server 102, when a communication game unperformable notification is received from the server 102, the communication is forcibly ended without playing the communication game. That is, participating in the communication game is refused. Furthermore, in a case that all the other participants (game apparatus 10) prematurely end the communication game during execution of the communication game, that is, in a case that the participant of the communication game is only its own game apparatus 10 as well, the communication game (communication) is forcibly ended.

The backup program 202*j* is a program for storing (saving) in the memory card 28 and the memory for saved data 56 the game data (proceeding data and result data) stored in the main memory 52 according to a predetermined event, such as an instruction from the player, etc.

Although illustration is omitted, in the program memory area 202, a sound output program, etc. are stored. The sound output program is a program for generating and outputting a sound (music) necessary for the communication game.

In the data memory area 204, the operation data buffer 204*a* and the transmitting and receiving data buffer 204*b* are provided. Furthermore, in the data memory area 204, image data 204*c* and participant information data 204*d* are stored.

The operation data buffer 204*a* is a buffer for storing (temporarily storing) operation data corresponding to the operation button 20 operated by the player or coordinate data input from the touch panel 22. The transmitting and receiving data buffer 204*b* is a buffer for storing (temporarily storing) data to be transmitted to another game apparatus 10 and the server 102, and receiving and temporarily storing data transmitted from another game apparatus 10 and the server 102.

The image data 204*c* is data, such as polygon data, texture data, etc. for generating the above-described game image data. The participant information data 204*d* is data as to a list (participant information) describing the identification information of the player (game apparatus 10) who is decided to participate in the communication game. Here, the participant information may be data as to simply the number of participants in the first embodiment. The participant information data 204*d* is transmitted from the server 102 as described above.

Although illustration is omitted, in the data memory area 204, other data required for executing the communication game processing, such as sound data, etc. are stored, and a flag, a counter (timer), etc. required for executing the communication game processing are also provided.

A specific operation is explained below. It should be noted that FIG. 8 to FIG. 11 is entire processing by the CPU 50 of the game apparatus 10, and FIG. 12 to FIG. 16 is entire processing by the CPU 102*a* of the server 102.

Figure 8:
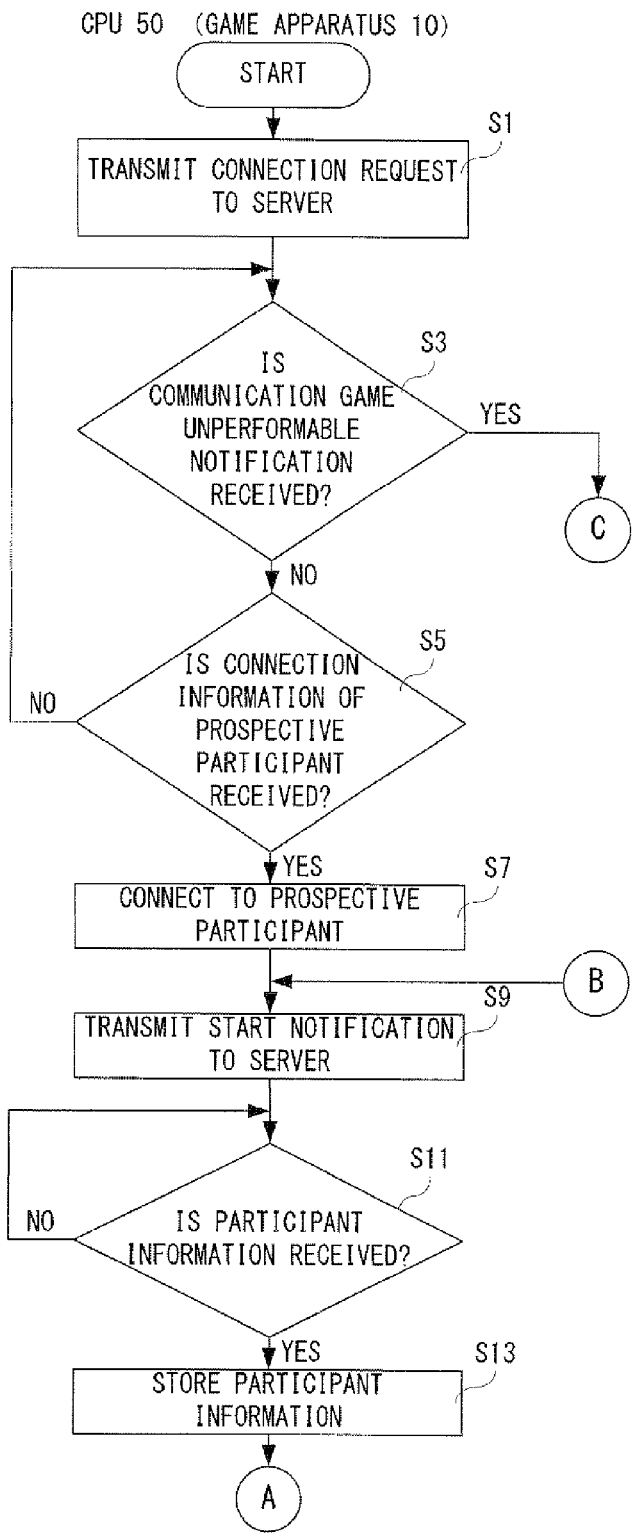
FIG. 8 is a flowchart showing a part of entire processing by a CPU of the game apparatus shown in FIG. 3.
Figure 9:
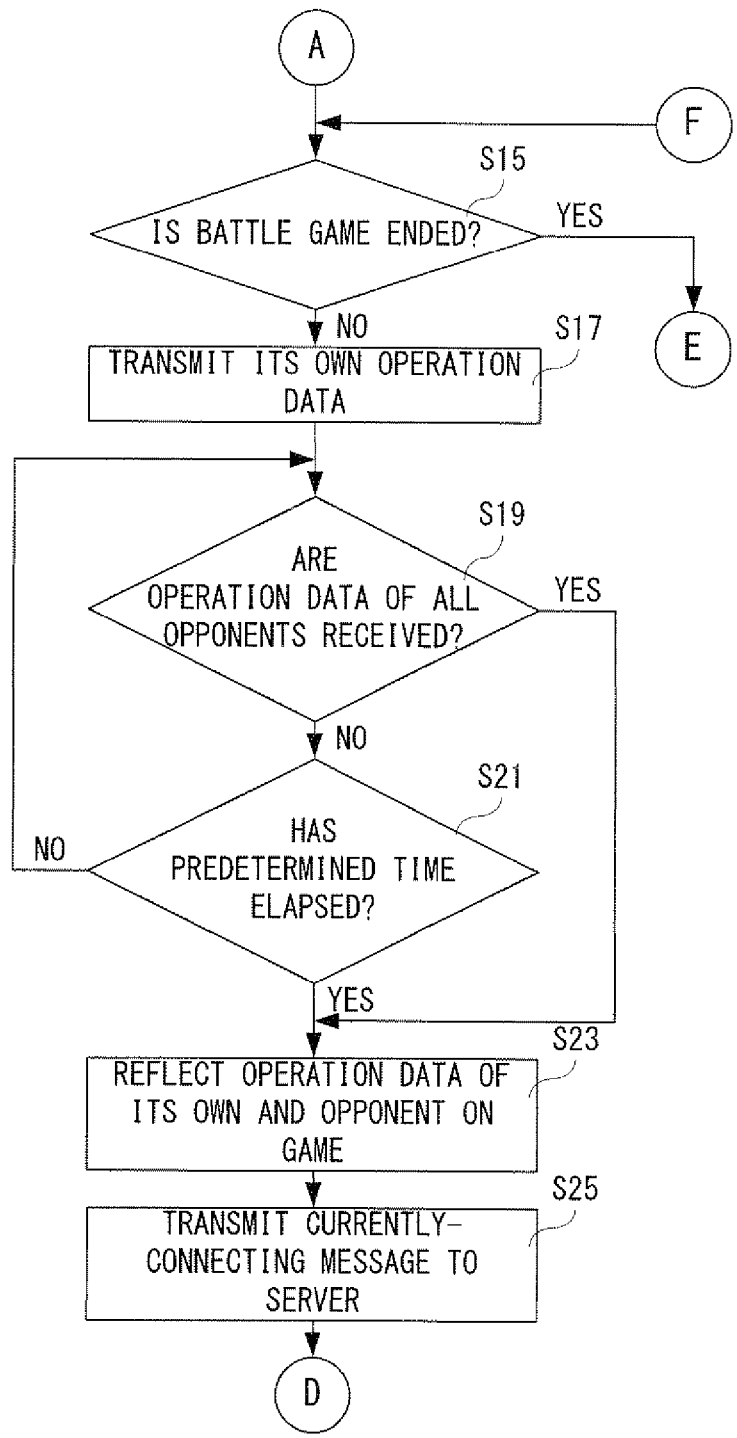
FIG. 9 is a flowchart showing a second part of the entire processing by the CPU of the game apparatus shown in FIG. 3, and the sequel to FIG. 8.

As shown in FIG. 8, when starting the entire processing, the CPU 50 of the game apparatus 10 transmits a connection request to the server 102 in a step Si. More specifically, the CPU 50 transmits a notification of an application for participation in the communication game to the serve 102. In a next step S3, it is determined whether or not a communication game unperformable notification is received from the server 102.

Figure 11:
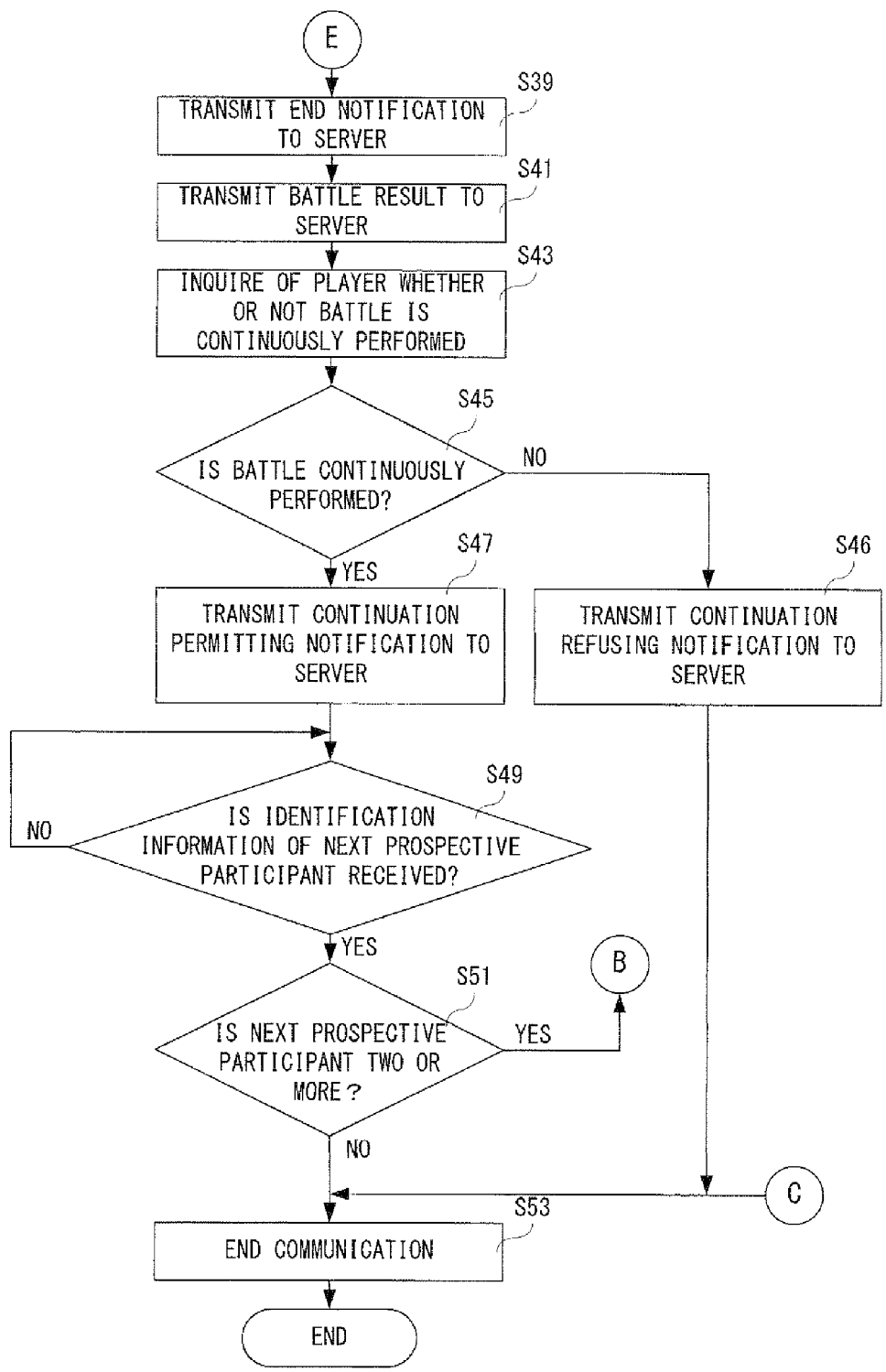
FIG. 11 is a flowchart showing a fourth part of the entire processing by the CPU of the game apparatus shown in FIG. 3, and the sequel to FIG. 9.

If "YES" in the step S3, that is, if a communication game unperformable notification is received from the server 102, the communication is ended in a step S53 shown in FIG. 11 to end the entire processing. That is, participating in the communication game is refused, and whereby, the communication is forcibly ended. On the other hand, if "NO" in the step S3, that is, if a communication game unperformable notification is not received from the server 102, it is determined whether or not connection information of a prospective participant is received from the server 102 in a next step S5.

If "NO" in the step S5, that is, if connection information of a prospective participant is not received from the server 102, the process returns to the step S3 as it is. On the other hand, if "YES" in the step S5, that is, if connection information of a prospective participant is received from the server 102, a connection is made with the game apparatus 10 of the prospective participant according to the connection information in a step S7. That is, the game apparatus 10 establishes a connected state with the game apparatus 10 of the prospective participant. In a succeeding step S9, a start notification is transmitted to the server 102.

Here, in the step S7, that connected states can be established with the game apparatuses 10 of all the prospective participants is a precondition, but as to the game apparatus 10 of the prospective participant with which a connected state cannot be established even after a lapse of a predetermined time (30 seconds, for example), it is determined that it does not participate in the current communication game, and the process proceeds to the step S9 as it is. Alternatively, when a connected state is not established with the game apparatuses 10 of all the prospective participants at this time, it is determined that it is impossible to participate in the communication game, and the process proceeds to the step S53.

Successively, in a step S11, it is determined whether or not participant information is received from the server 102. If "NO" in the step S11, that is, if participant information is not received from the server 102, the process returns to the same step S11. On the other hand, if "YES" in the step S11, that is, if participant information is received from the server 102, the participant information (participant information data 204*d*) is stored in the main memory 52 in a step S13, and it is determined whether or not the battle is ended in a step S15 shown in FIG. 9. That is, the CPU 50 determines whether or not the communication game is normally ended based on the conditions that winning or losing is decided of the battle game, that the game is over, that a stage clear is made, etc.

If "YES" in the step S15, that is, if the battle is ended, the process proceeds to a step S39 shown in FIG. 11. On the other hand, if "NO" in the step S15, that is, if the battle is not ended, own operation data is transmitted to the game apparatus 10 of the opponent (another participant) in a step S17.

Although detailed explanation is omitted, in the step S17, the CPU 50 transmits a copy of the operation data stored in the operation data buffer 204*a* with the addition of the identification information of its own game apparatus 10 to the game apparatus 10 of the opponent by using the wireless communication module 64. Here, the operation data may be broadcasted to the game apparatus 10 of the opponent, or circulatively transmitted among respective game apparatuses 10 of a plurality of opponents.

In a succeeding step S19, it is determined whether or not the operation data of all the opponents are received. Here, the CPU 50 determines whether or not operation data from the game apparatuses 10 of all the participants (opponents) are received with reference to the participant information data 204*d*. If "YES" in the step S19, that is, if the operation data of all the opponents are received, the process proceeds to a step S23 as it is. On the other hand, if "NO" in the step S19, that is, if there is the game apparatus 10 of the opponent from which the operation data is not received, it is determined whether or not a predetermined time has elapsed in a step S21. The CPU 50 acquires a time from when the own operation data has been transmitted, or a time from when the operation data has been first received from the opponent on the basis of the time counted by the RTC 68, and determines whether or not the acquired time is longer than a predetermined time (10 seconds, for example).

If "NO" in the step S21, that is, if a predetermined time has not elapsed, the process returns to the step S19 as it is. On the other hand, if "YES" in the step S21, that is, if a predetermined time has elapsed, the operation data of its own player and the opponent are reflected on the game in the step S23. More specifically, the CPU 50 updates the game screen by updating a position of each player character and controlling a motion of each player character in the step S23. Here, if there is an opponent from whom the operation data cannot be received, the player character of the opponent may be stopped, or a position and a motion may be estimated from the past operation data. At this time, the CPU 50 generates and outputs a sound (music) required for the game. Furthermore, the CPU 50 executes scoring processing as required. In a next step S25, a currently-connecting message is transmitted to the server 102.

Figure 10:
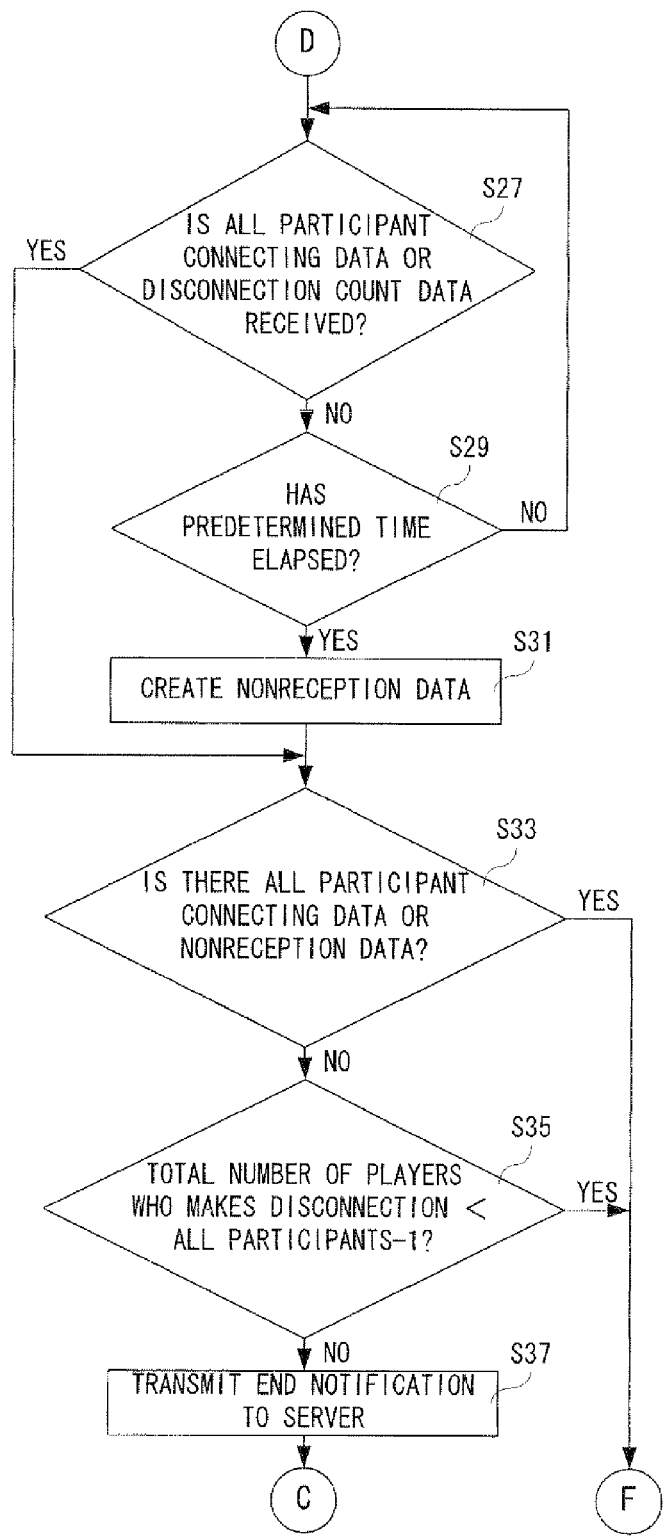
FIG. 10 is a flowchart showing a third part of the entire processing by the CPU of the game apparatus shown in FIG. 3, and the sequel to FIG. 9.

Successively, in a step S27 shown in FIG. 10, it is determined whether or not all participant connecting data or disconnection count data is received from the server 102. Here, in the first embodiment, the game apparatus 10 manages the participant information (participant information data 204d), and therefore, the server 102 transmits identification information of the game apparatus 10 (player) which prematurely ends the communication game in place of the disconnection count data, and the game apparatus 10 receives the same, and whereby, it is possible to know the number of players that disconnects the communication (the number of players that prematurely ends the communication game).

If "YES" in the step S27, that is, if all participant connecting data or disconnection count data is received from the server 102, the process shifts to a step S33 as it is. On the other hand, if "NO" in the step S27, that is, if all participant connecting data and disconnection count data are not received from the server 102, it is determined whether or not a predetermined time has elapsed in a step S29. Although illustration is omitted, the CPU 50 acquires a time from when the currently-connecting message has been transmitted to the server 102 on the basis of the time counted by the RTC 68, and determines whether or not the acquired time is longer than a predetermined time (30 seconds, for example).

If "NO" in the step S29, that is, if a predetermined time has not elapsed, the process returns to the step S27 as it is. On the other hand, if "YES" in the step S29, that is, if a predetermined time has elapsed, nonreception data is created in a step S31, and the process proceeds to the step S33. Here, the nonreception data is data indicating that all participant connecting data and disconnection count data could not be received from the server 102. Furthermore, the nonreception data is temporarily stored in a buffer area (not illustrated) of the main memory 52.

In the step S33, it is determined whether or not there is all participant connecting data or nonreception data. If "YES" in the step S33, that is, if there is all participant connecting data or nonreception data, the process returns to the step S15 shown in FIG. 9 to continue the communication game. On the other hand, if "NO" in the step S33, that is, if there is disconnection count data, it is determined whether or not the total number of players who makes disconnection is smaller than all the participants −1 in a step S35. That is, it is determined whether or not only its own game apparatus 10 is not participating in the communication game. Here, the number indicated by the disconnection count data is a total number of game apparatuses 10 (a total number of players who makes disconnection) that prematurely ends from the start of the communication game to the current time.

In the first embodiment, even if there is the nonreception data as well, the communication game is continued, but if the nonreception data is successively created, there is a high possibility that a communication of its own game apparatus 10 is stopped. Thus, the number of nonreception data successively created is counted, and if the number is above the predetermined number (3, for example), the communication (communication game) may be ended.

Returning to FIG. 10, if "YES" in the step S35, that is, if the total number of the players who makes disconnection is smaller than all the participants −1, the process returns to the step S15 as it is to continue the communication game. On the other hand, if "NO" in the step S35, that is, if the total number of players who makes disconnection is larger than all the participants −1, an end notification is transmitted to the server 102 in a step S37, and the process proceeds to the step S53. In the first embodiment, in a case that the participant in the communication game is only the own game apparatus 10, the communication game is set to be ended (normal end). Here, even in such a case, the communication game may be continued. These are matters decided in correspondence with the kind and the design of the communication game.

Additionally, when the battle game is ended, "YES" is determined in the step S15 as described above, and an end notification is transmitted to the server 102 in a step S39 shown in FIG. 11. Here, in a case that the own game apparatus 10 prematurely ends the communication game halfway, such an end notification is not transmitted. In a succeeding step S41, a battle result is transmitted to the server 102. In the first embodiment, the battle result is transmitted to the server 102, but in each game apparatus 10, the battle result may be backed up.

In a next step S43, the player is inquired whether the battle game is successively played. Here, the CPU 50 displays the selection screen for selecting whether communication game playing is performed with the same opponent again is displayed on the first LCD 16 or the second LCD 18, or both of them. Here, as described above, it is possible to also select to stop the communication game and play the battle game with another player on the selection screen.

In a step S45, it is determined whether or not the battle game is successively played. That is, the CPU 50 determines whether or not playing the communication game with the same opponent again is selected on the selection screen. If "NO" in the step S45, that is, if stopping the communication game or playing the battle game with another player is selected, a continuation refusing notification is transmitted to the server 102 in a step S46, and the process proceeds to the step S53.

Although illustration is omitted, in a case of playing the battle game with another player, a notification of an application for participation in the communication game in order to play the battle game with another player is transmitted to the server 102, and then, the process returns to the step S3 shown in FIG. 8.

Alternatively, if "YES" in the step S45, that is, if successively playing the battle game with the same opponent is selected, a continuation permitting notification is transmitted to the server 102 in a step S47, and it is determined whether or not identification information of a next prospective participant is received from the server 102 in a step S49. If "NO" in the step S49, that is, if the identification information of the next prospective participant is not received from the server 102, the process returns to the same step S49. On the other hand, if "YES" in the step S49, that is, if the identification information of the next prospective participant is received from the server 102, it is determined whether or not the next prospective participant is equal to or more than two in a step S51. That is, the CPU 50 determines whether or not identification information other than the identification information of the game apparatus 10 (player) is also described in the received identification information of the prospective participant.

If "YES" in the step S51, that is, if he next prospective participant is equal to or more than two, the process returns to the step S9 shown in FIG. 8 to perform the battle game again. On the other hand, if "NO" in the step S51, that is, if the next prospective participant is less than two, the communication game is not established, and therefore, the communication is ended in the step S53 to thereby end the entire processing.

Figure 12:
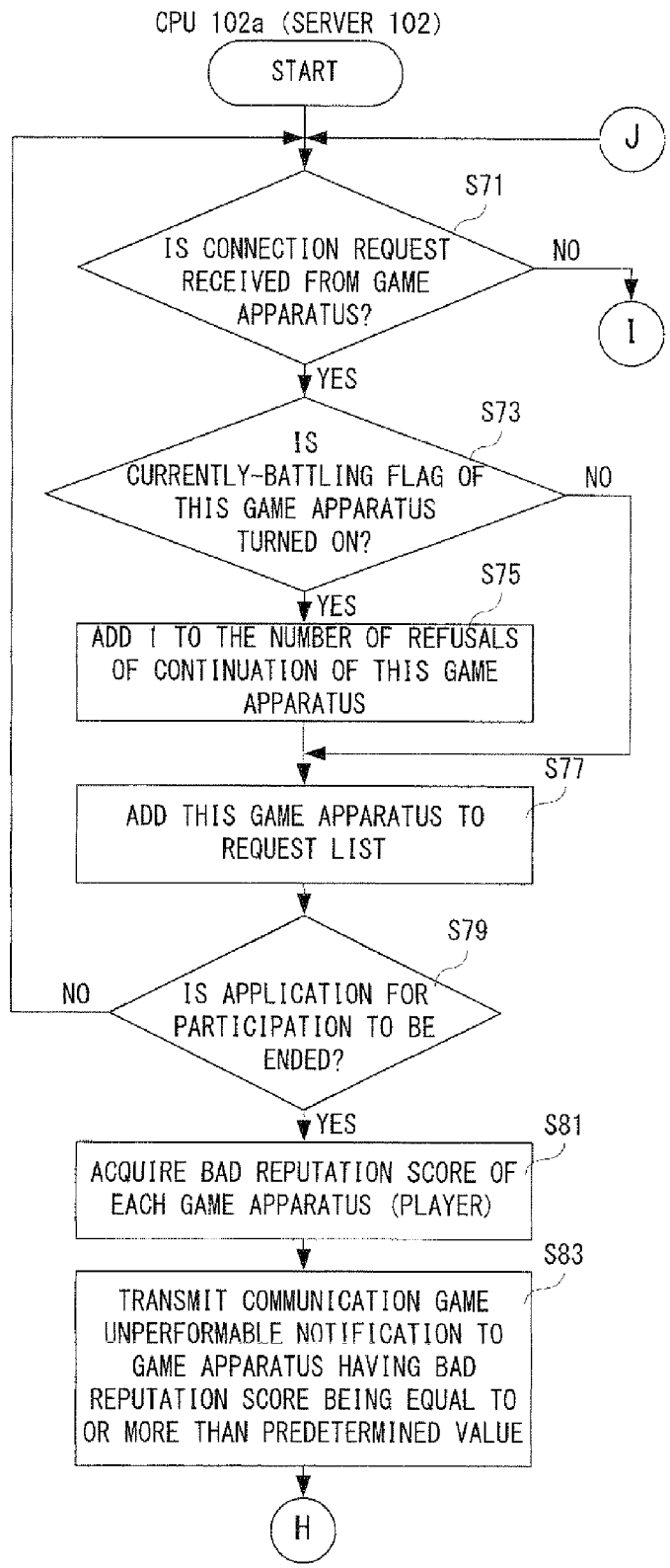
FIG. 12 is a flowchart showing a part of entire processing by a CPU of the server shown in FIG. 4.

As shown in FIG. 12, when starting the entire processing, the CPU 102a of the server 102 determines whether or not a connection request (notification of an application for participation) from the game apparatus 10 is received in a step S71. If "NO" in the step S71, that is, if a connection request from the game apparatus 10 is not received, the process proceeds to a step S89 shown in FIG. 13 as it is. On the other hand, if "YES" in the step S71, that is, if a connection request from the game apparatus 10 is received, it is determined whether or not the currently-battling flag 154h of the game apparatus 10 is turned on in a step S73. Here, the CPU 102a reads from the database 106 the currently-battling flag 154h of the game apparatus 10 being a sender of the connection request, and determines whether or not the currently-battling flag 154h is turned on.

If "NO" in the step S73, that is, if the currently-battling flag 154h of the game apparatus 10 is turned off, it is determined that the previous communication game is normally ended, and the process proceeds to a step S77 as it is. On the other hand, if "YES" in the step S73, that is, if the currently-battling flag 154h of the game apparatus 10 is turned on, it is determined that the previous communication game is not normally ended, that is, it is determined that the previous communication game is prematurely ended, and the number of refusals of continuation of the game apparatus 10 is added by one in a step S75, and the process proceeds to the step S77. That is, in the step S75, the CPU 102a reads from the database 106 continuation refusal count data 154g as to the game apparatus 10 being the sender of the connection request, and adds the number of refusals of continuation indicated by the continuation refusal count data 154g by one.

In the step S77, this game apparatus 10 is added to the request list. Here, the CPU 102a adds the identification information of the game apparatus 10 being the sender of the connection request to the request list indicated by the request list data 154b. Successively, in a step S79, it is determined whether or not an application for participation is to be ended. For example, when a predetermined time (60 seconds, for example) has elapsed from the start of the reception for participation (previous opponent deciding processing), or when a predetermined number of applications for participation is accepted, the CPU 102a determines that a reception for participation is ended. If "NO" in the step S79, that is, if a reception for participation is not ended, the process returns to the step S71. On the other hand, if "YES" in the step S79, that is, if a reception for participation is ended, a bad reputation score as to each game apparatus 10 (player) is acquired in a step S81. That is, the CPU 102a reads the bad reputation score data 154f as to each of the game apparatuses 10 (player) corresponding to the identification information described in the request list from the database 106.

In a succeeding step S83, a communication game unperformable notification is transmitted to the game apparatus 10 having a bad reputation score being equal to or more than a predetermined value. In the first embodiment, the bad reputation score is added from a minimum value (0), and the predetermined value is arbitrarily decided by a manager, etc. of the game system 100 (server 102). Thus, as described above, the game apparatus 10 (player) having a bad reputation score being equal to or more than the predetermined value is refused to even participate in the communication game.

Figure 13:
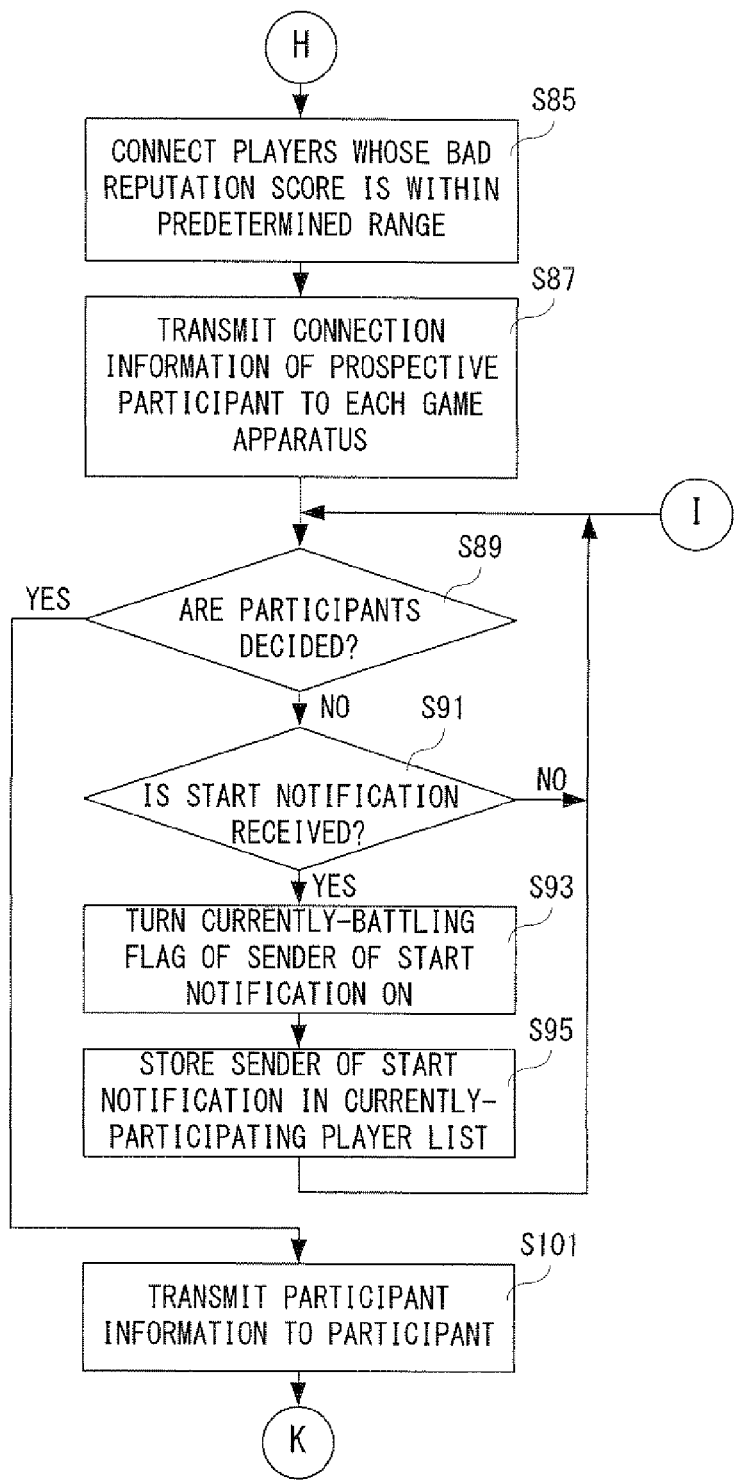
FIG. 13 is a flowchart showing a second part of the entire processing by the CPU of the server shown in FIG. 4, and the sequel to FIG. 12.

As shown in FIG. 13, in a next step S85, the players whose bad reputation score is within the predetermined range are connected (matched). That is, the CPU 102a decides the prospective participants such that the players (game apparatus 10) who have the same or the same level of the bad reputation score become each other's opponents. Accordingly, one group being made up of two game apparatuses 10 or three or more game apparatuses 10 is generated as prospective participants. For example, in the step S85, two or more groups may be generated, and the processing after a step S87 onward is executed for each group. Here, for simplicity, in the step S85, based on an assumption that one group is generated, the processing after the step S87 onward is explained.

In the step S87, the connection information of the prospective participant is transmitted to each game apparatus 10. That is, the CPU 102a transmits the connection information of the other prospective participants (IP address) to each prospective participant (game apparatus 10) included in the group. In the next step S89, it is determined whether or not the game apparatus being a participant in a current communication game is decided out of the game apparatuses to which the connection information are transmitted. Here, the CPU 102a determines whether or not a predetermined time (60 seconds, for example) has elapsed from when connection information of the game apparatuses 10 of the other prospective participants are transmitted to the game apparatus 10 of each of the prospective participants included in the group, or whether or not a start notification is received from the game apparatuses 10 of all the prospective participants.

Although illustration is omitted, a timer for counting a predetermined time (60 seconds) is provided inside the server 102, and the CPU 102a starts the timer when the processing in the step S87 is executed, and determines whether or not a predetermined time has elapsed according to the count value by the timer in the step S89. If the count value by the timer reaches the predetermined value, a time-out is regarded to determine the participants are decided. Even if the count value does not reach the predetermined value, if the start notifications are received from the game apparatuses 10 of all the prospective participants, it is determined that the participants are decided. Additionally, when a start notification is received from any one of the game apparatuses 10 of the prospective participants during the count by the timer, the count value is reset to thereby determine that the participants are decided depending on whether or not a predetermined time has elapsed from the last reception of the start notification from any one of the game apparatuses 10 of the prospective participants.

If "NO" in the step S89, that is, if the participants in the current communication game have not been decided, the process proceeds to a step S91. On the other hand, if "YES" in the step S89, that is, if the participants in the current communication game have been decided, the process proceeds to a step S101.

In the step S91, it is determined whether or not a start notification is received from any one of the game apparatuses 10 which transmit the connection information of the prospective participants. If "NO" in the step S91, that is, if a start notification is not received from the game apparatus 10, the process returns to the step S89. On the other hand, if "YES" in the step S91, that is, if a start notification is received from the game apparatus 10, the currently-battling flag 154h as to the game apparatus 10 being the sender of the start notification is turned on in a step S93, the game apparatus 10 being the sender of the start notification is stored in the currently-participating player list in a step S95, and then, the process returns to the step S89. That is, in the step S95, the CPU 102a describes the identification information of the game apparatus 10 being the sender of the start notification in the currently-participating player list as shown in FIG. 6 indicated by the currently participating player list data 154d, and turns off the premature ending flag provided by being brought into correspondence with the identification information. Thus, the player of the game apparatus 10 being the sender of the start notification is registered in the currently-participating player list as a participant in the current communication game.

Figure 14:
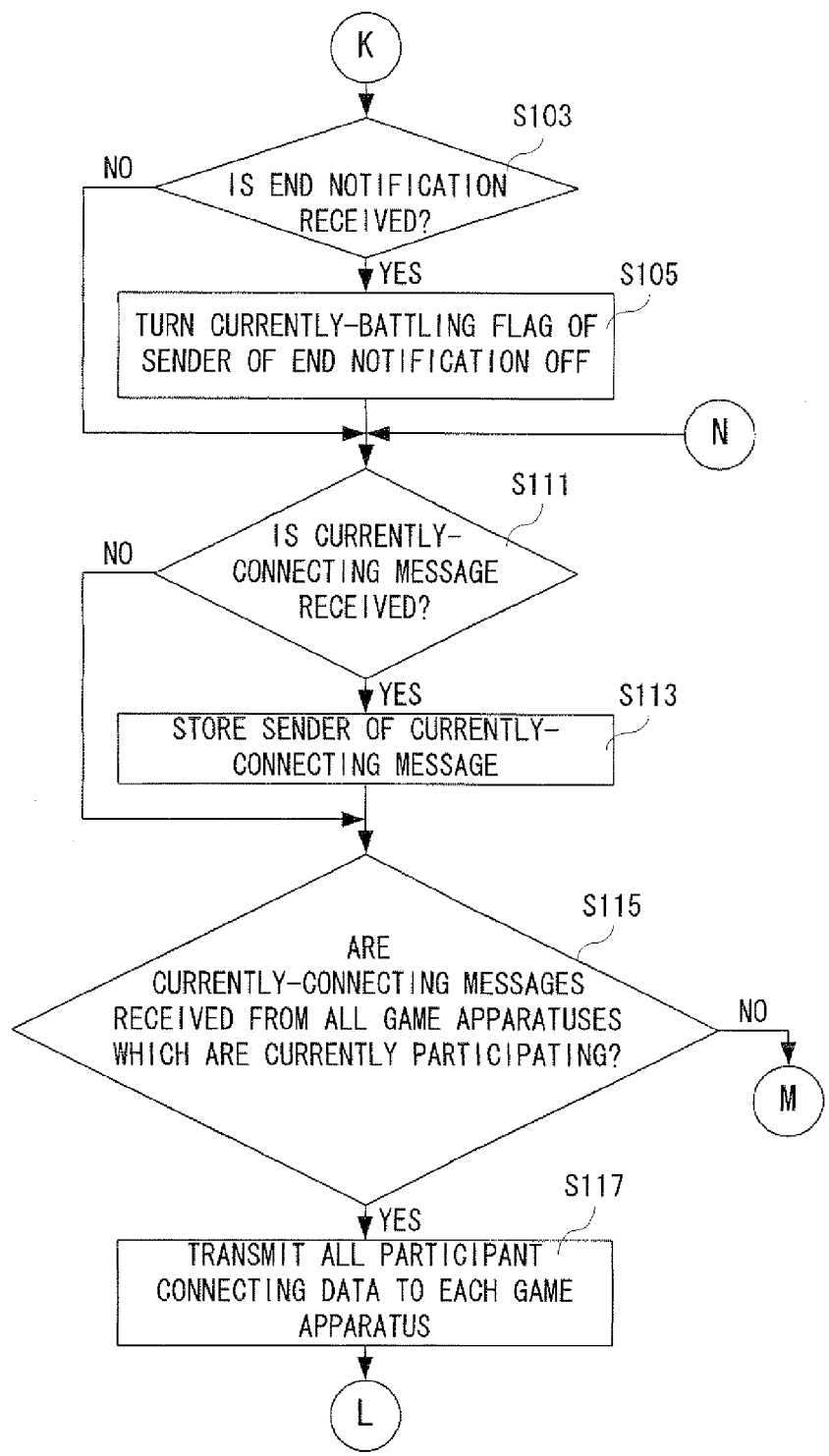
FIG. 14 is a flowchart showing a third part of the entire processing by the CPU of the server shown in FIG. 4, and the sequel to FIG. 13.

Then, in a step S101, the participant information data is transmitted to the game apparatuses 10 of all the participants, and the process proceeds to a step S103 shown in FIG. 14. Here, the participant information data is data as to the information (list) obtained by extracting the identification information of the game apparatus 10 described in the currently-participating player list.

Moreover, as described above, data of the number of participants (the total number of participants) may be transmitted as participant information data.

As shown in FIG. 14, in the step S103, it is determined whether or not an end notification is received from any one of the game apparatuses 10 which are participating in the communication game. If "NO" in the step S103, that is, if an end notification is not received from the game apparatus 10, the process proceeds to a step S111. On the other hand, if "YES" in the step S103, that is, if an end notification is received from the game apparatus 10, the currently-battling flag 154h as to the game apparatus 10 of the sender of the end notification is turned off in a step S105, and the process proceeds to the step S111. That is, in the step S105, normally ending the communication game by the game apparatus 10 being the sender of the end notification is recorded.

In the step S111, it is determined whether or not a currently-connecting message is received from the game apparatus 10. If "NO" in the step S111, that is, if a currently-connecting message is not received from the game apparatus 10, the process proceeds to a step S115 as it is. On the other hand, if "YES" in the step S111, that is, if a currently-connecting message is received from the game apparatus 10, the identification information of the game apparatus 10 being the sender of the currently-connecting message is temporarily stored in the buffer area (not illustrated) of the RAM 102b in a step S113, and the process proceeds to the step S115.

In the step S115, it is determined whether or not the currently-connecting messages are received from all the game apparatuses 10 which are currently participating. That is, the CPU 102a determines whether or not the currently-connecting messages are received from all the game apparatuses 10 of the identification information for which the premature ending flag is turned off in the currently-participating player list. If "NO" in the step S115, that is, if there is the game apparatus 10 from which the currently-connecting message is not received out of the game apparatuses 10 which are currently participating, the process proceeds to a step S119 shown in FIG. 15. On the other hand, if "YES" in the step S115, that is, if the currently-connecting messages are received from all the game apparatuses 10 which are currently participating, all participant connecting data is transmitted to each of the game apparatuses 10 which is participating in a step S117, and the process proceeds to a step S127 shown in FIG. 15.

Figure 15:
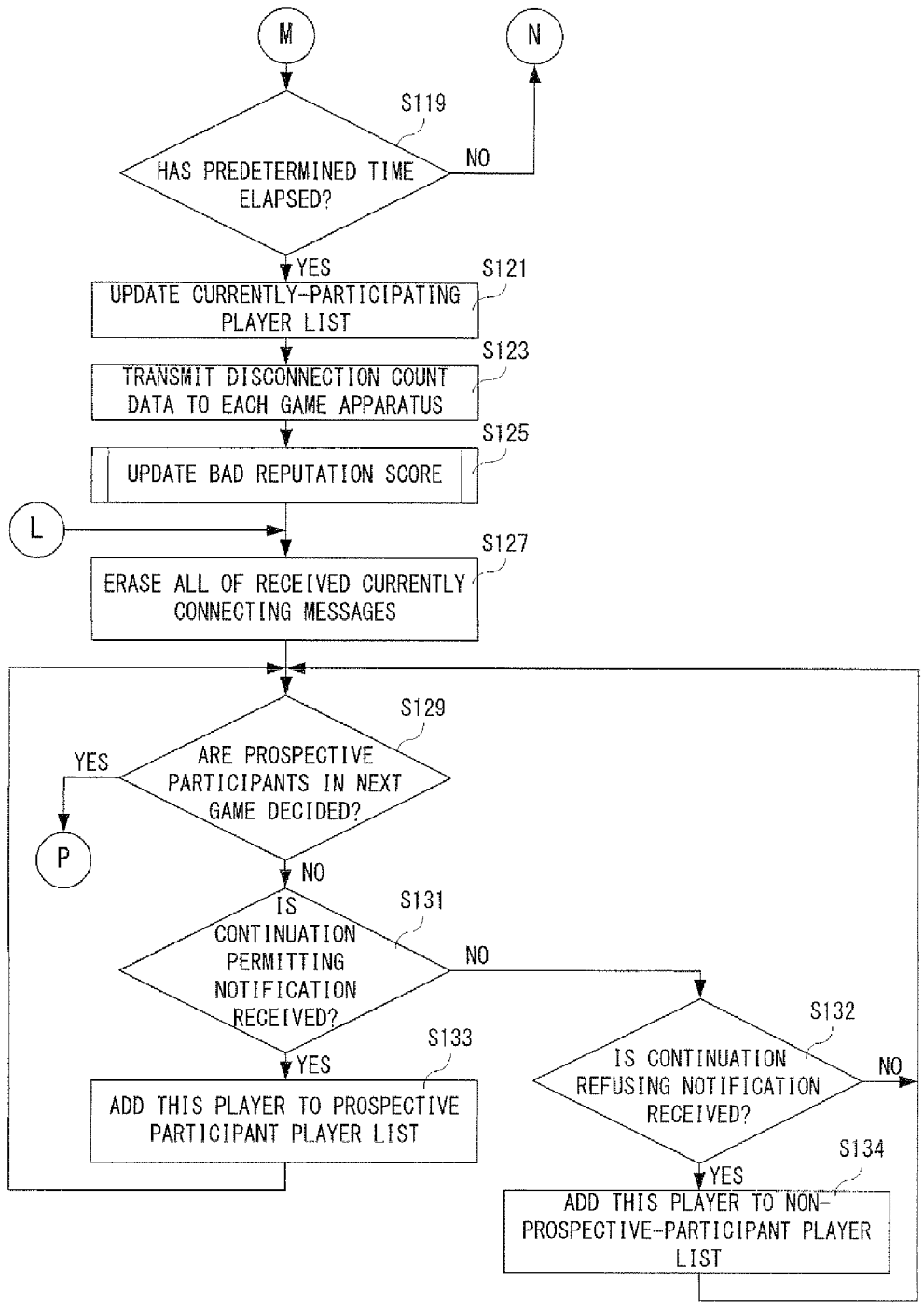
FIG. 15 is a flowchart showing a fourth part of the entire processing by the CPU of the server shown in FIG. 4, and the sequel to FIG. 14.

In the step S119 shown in FIG. 15, it is determined whether or not a predetermined time has elapsed. Although illustration is omitted, the CPU 102a determines whether or not a predetermined time (10 seconds, for example) has elapsed from the start of the internal timer in response to the first reception of the connection message in the step S111 in the current session.

Here, a method of counting the predetermined time is not restricted thereto, and the value of the internal timer is stored in response to the first reception of the connection message so as to calculate the difference from the current timer value, and this may be determined depending on whether the difference reaches the predetermined value.

If "NO" in the step S119, that is, if the predetermined time has not elapsed, the process returns to the step S111 shown in FIG. 14. On the other hand, if "YES" in the step S119, that is, if the predetermined time has elapsed, the currently-participating player list is updated in a step S121. That is, in the step S121, the CPU 102a determines, as to the game apparatus 10 from which the currently-connecting message has not been received within a predetermined time, that it prematurely ends the communication game, and turns on the premature ending flag corresponding to the identification information of the game apparatus 10 in the currently-participating player list.

Successively, in a step S123, the disconnection count data is transmitted to each of the game apparatuses 10 that is currently participating. That is, the CPU 50 transmits the disconnection count data corresponding to the number of game apparatuses 10 for which the premature ending flag is turned on in the currently-participating player list to each of the game apparatuses 10 for which the premature ending flag is turned off. In addition, in a step S125, bad reputation updating processing (see FIG. 17) described later is executed, and in the step S127, all the received currently-connecting messages are erased. That is, the currently-connecting data as to the current session are erased. Here, the processing in the step S125 is executed for each game apparatus 10 in a case that there are a plurality of game apparatuses 10 that are ended halfway of the communication game, that is, that are participating in the communication game.

In a step S129, it is determined whether or not prospective participants in a next communication game are decided after the communication game is once ended. Here, the CPU 102a determines whether or not a predetermined time (30 seconds, for example) has elapsed without receiving a continuation permitting notification or a continuation refusing notification described later, whether or not a predetermined time (30 seconds, for example) has elapsed since the continuation permitting notification or the continuation refusing notification was received last, or whether or not the continuation permitting notification or the continuation refusing notification are received from all the game apparatuses 10 which normally ended the immediately preceding communication game. The CPU 102a can determine whether or not the continuation permitting notification or the continuation refusing notification is received from all the game apparatuses 10 by referring to the prospective participant player list and the non-prospective-participant player list.

Here, as to the continuation permitting notification or the continuation refusing notification from the game apparatus 10 whose identification information are respectively not described in the prospective participant player list and the non-prospective-participant player list, the CPU 102a can determine that the continuation permitting notification or the continuation refusing notification is not received.

Additionally, the CPU 102a starts the internal timer not shown in the first determination in the step S129 to determine whether or not a predetermined time has elapsed. Furthermore, by resetting the count value of the internal timer every reception of the continuation permitting notification and the continuation refusing notification, it may be possible to count a time from when the continuation permitting notification and the continuation refusing notification are last received.

If "NO" in the step S129, that is, if the prospective participants are not decided, the process proceeds to a step S131. On the other hand, if "YES" in the step S129, that is, if the prospective participants are decided, the process proceeds to a step S139 in FIG. 16 described later. In the step S131, it is determined whether or not a continuation permitting notification is received from the game apparatus 10. If "NO" in the step S131, that is, if a continuation permitting notification is not received from the game apparatus 10, the process proceeds to a step S132. On the other hand, if "YES" in the step S131, that is, if a continuation permitting notification is received from the game apparatus 10, the game apparatus 10 (player) is added to the prospective participant player list in a step S133, and the process returns to the step S129. That is, the CPU 102a describes the identification information of the game apparatus 10 being a sender of the continuation permitting notification in the prospective participant player list indicated by the prospective participant player list data 154c in the step S133.

Furthermore, in the step S132, it is determined whether or not a continuation refusing notification is received from the game apparatus 10. If "NO" in the step S132, that is, if a continuation refusing notification is not received from the game apparatus 10, the process returns to the step S129 as it is. On the other hand, if "YES" in the step S132, that is, if a continuation refusing notification is received from the game apparatus 10, the player is added to the non-prospective-participant player list in a step S134, and then, the process returns to the step S129. That is, the CPU 102a describes the identification information of the game apparatus 10 being the sender of the continuation refusing notification in the non-prospective-participant player list indicated by the non-prospective-participant player list data 154e in a step S134.

Figure 16:
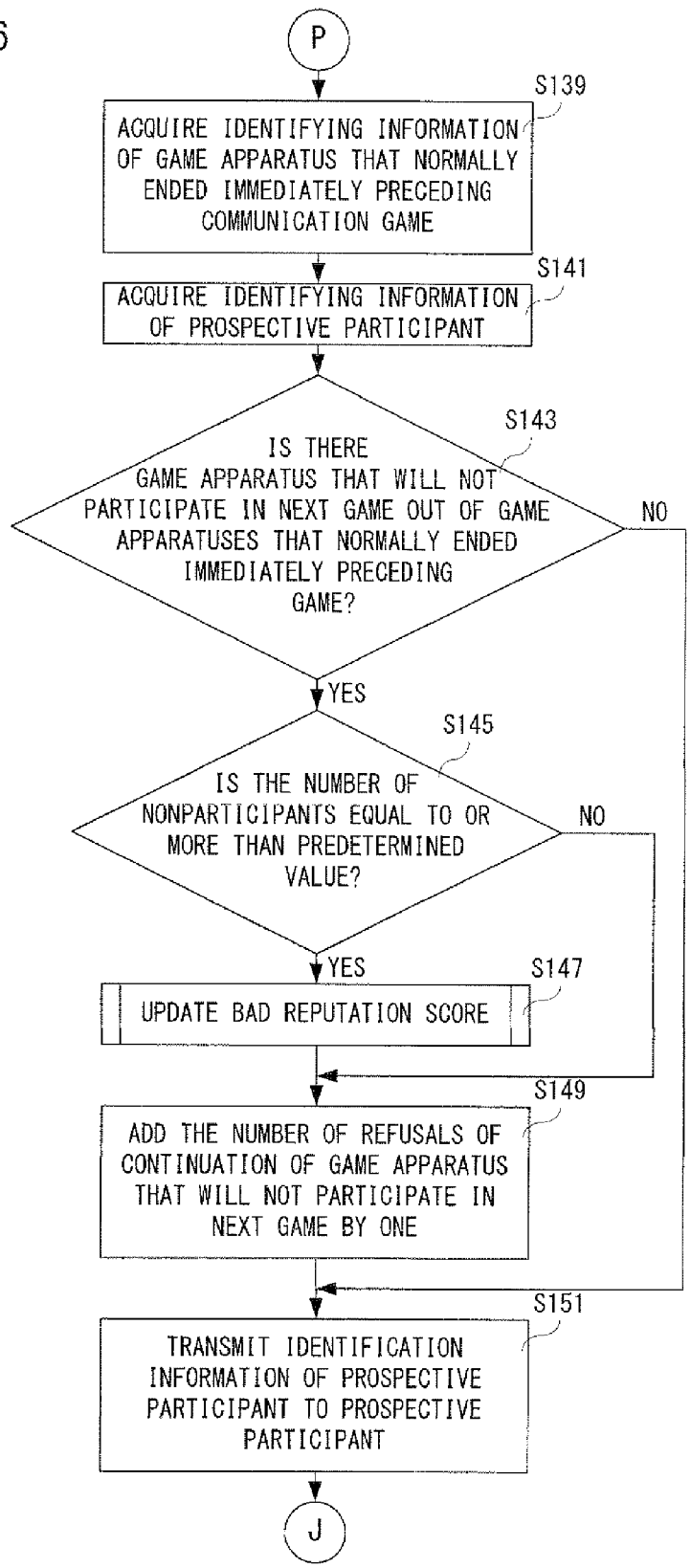
FIG. 16 is a flowchart showing a fifth part of the entire processing by the CPU of the server shown in FIG. 4, and the sequel to FIG. 15.

As shown in FIG. 16, in the step S139, the identification information of the game apparatus 10 that normally ended the immediately preceding communication game is acquired. Here, the CPU 102a acquires the identification information of the game apparatus 10 (player) for which the premature ending flag is turned off with reference to the currently-participating player list.

In a next step S141, the identification information of each of the prospective participants is acquired. Here, the CPU 102a acquires the identification information of the game apparatuses 10 (player) described in the prospective participant list with reference to the prospective participant list. Successively, in a step S143, it is determined whether or not there is the game apparatus 10 (player) that will not participate in the next game out of the game apparatuses 10 (players) that normally ended the immediately preceding communication game. That is, the CPU 102a determines whether or not the number of identification information of the participants that normally ended the immediately preceding communication game acquired in the step S139 is more than the number of identification information of the prospective participants acquired in the step S141.

If "NO" in the step S143, that is, if all the game apparatuses 10 (player) that normally ended the immediately preceding communication game will participate in the next communication game, the process proceeds to a step S151 as it is. On the other hand, if "YES" in the step S143, that is, if there is the game apparatus 10 (players) that will not participate out of the players that normally ended the immediately preceding communication game, it is determined whether or not the number of nonparticipants is equal to or more than a predetermined value in a step S145. For example, the predetermined value is set to "3". Here, it may be possible to determine whether or not a ratio of the nonparticipants to the total number of game apparatuses 10 (players) that normally ended the preceding game is equal to or more than a predetermined ratio (30%, for example) in place of the predetermined value. Furthermore, the predetermined value and the predetermined ratio may be variably set depending on the total number of game apparatuses 10 (players) that normally ended the preceding game.

Here, in the first embodiment, when most of the participants encounter an illegal act and an unpleasant act, it seems that they will not continue the next communication game, and refuse to continue the next communication game in unison. However, if the next communication game is merely refused, such as having something to do, it is unlikely that most of the participants refuse to participate in the next communication game in unison, and it seems that a few participants merely refuse. In a case that the number of nonparticipants is equal to or more than the predetermined value (predetermined ratio) based on the aforementioned assumption, the player who successively plays the next communication game is determined as a player who performs an illegal act and an unpleasant act, and whereby, the bad reputation score is updated, but there is no need of being restricted thereto. If there is one nonparticipant irrespective of the number of nonparticipants, the bad reputation score of the player who successively plays the next communication game may be updated.

If "NO" in the step S145, that is, if the number of nonparticipants is less than the predetermined value, it is determined that the bad reputation score is not updated, and the process proceeds to a step S149 as it is. On the other hand, if "YES" in the step S145, that is, if the number of nonparticipants is equal to or more than the predetermined value, bad reputation updating processing is executed in a step S147. Here, in the step S147, the immediately preceding communication game is normally ended, and the bad reputation scores as to the game apparatuses 10 (player) that will participate in the next game are updated. Then, in the step S149, the number of refusals of continuation as to the game apparatuses 10 (players) that will not participate in the next game is added by one, in the step S151, the identification information of the prospective participant is transmitted to each of the game apparatuses 10 of the prospective participants, and then, the process returns to the step S71.

Figure 17:
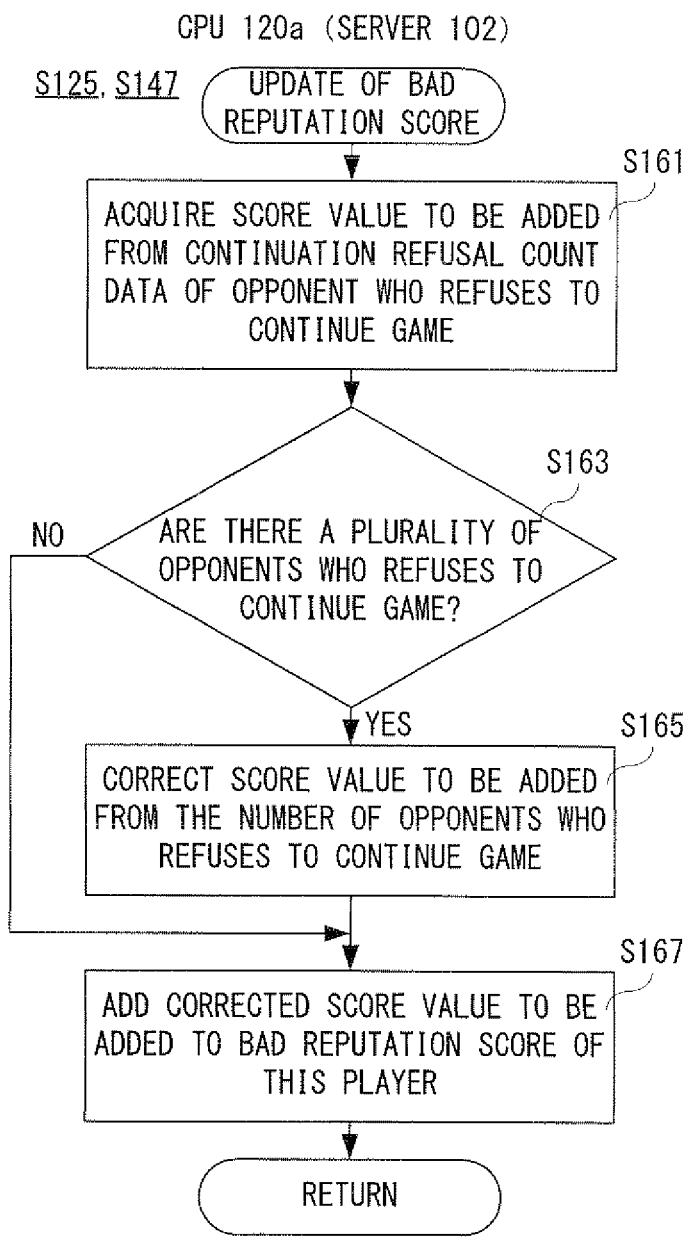
FIG. 17 is a flowchart showing bad reputation updating processing by the CPU of the server shown in FIG. 4.

FIG. 17 is a flowchart of the bad reputation updating processing in the step S125 shown in FIG. 15 and the step S147 shown in FIG. 16. As shown in FIG. 17, when starting the bad reputation updating processing, the CPU 102a acquires a score value to be added from the continuation refusal count data 154g of the opponent who refuses to continue the game in a step S161. Here, the "opponent who refuses to continue" is a game apparatus 10 (player) that ends the communication game halfway or the game apparatus 10 (player) that refuses to participate in the next communication game. In the step S161, in a case that the number of refusals of continuation is more, the score value to be added is set to a relatively smaller value. This is to prevent an action of intentionally heightening the bad reputation score of the player who is ended halfway of the communication game or is refused to participate in the next communication game by frequently prematurely ending the communication game and refusing the participation in the next communication game from occurring. Furthermore, as to the player who wants to play the communication game with various players, the number of refusals of continuation is naturally increased, and thus, this is to prevent the bad reputation score of the player who is disconnected without any malice from being heightened.

For example, the score value to be added of the reputation score is decided for each continuation refusal count and each range of the number of refusals of continuation. Here, as described above, as the larger the number of refusals of continuation is, the smaller the score value to be added is. Thus, a table in which the score values to be added are set in advance in correspondence with the number of refusals of continuation or the range is prepared, and with reference to them, the score value to be added can be decided. Furthermore, the score value to be added with respect to the number of refusals of continuation may be decided by an equation (inversely proportional equation, for example).

Here, in the step S161, if there are a lot of opponents who refuse to continue the game, the score values to be added are acquired from the continuation refusal count data 154g of the respective opponents so as to acquire the summed values.

In a succeeding step S163, it is determined whether or not there are a plurality of opponents who refuse to continue the game. That is, it is determined whether or not there are a plurality of opponents who refuse to continue the game at the same or around the same time. If "NO" in the step S163, that is, if there is one opponent who refuses to continue the game, the process proceeds to a step S167 as it is. On the other hand, if "YES" in the step S163, that is, if there are a plurality of opponents who refuse to continue the game, the score value to be added is corrected from the number of opponents who refuses to continue the game in a step S165. Here, the more the number of opponents who refuse to continue the game, the larger the score value to be added is. Thus, a table describing the score value to be added increasing in a numerical value or magnification in correspondence with the number of opponents who refuse to continue the game or the range thereof, for example, is prepared, and with reference to the table, the score value to be added can be corrected. Furthermore, a corrected score value to be added with respect to the number of opponents who refuses to continue the game may be decided by an equation (proportional equation, for example). Or, the number of opponents who refuses to continue the game may be multiplied by the score value to be added.

In addition, in the first embodiment, in a case that a refusal of continuation is received by a plurality of opponents at the same time or around the same time at a time, by considering that the illegal act and the unpleasant act are more malicious than when a refusal of continuation is dispersively received from a plurality of opponents at different times, the score value to be added is made larger in the step S165. Here, the plurality of score values to be added are calculated in the step S161, and therefore, the processing in the step S165 may not be executed. In such a case, the step S163 is also omitted.

Then, in the step S167, the corrected score value to be added is added to the bad reputation score of the player (game apparatus 10), and then, the process returns to the entire processing.

According to the first embodiment, the bad reputation score is updated as to the player who is ended halfway of the communication game or is refused to play the next communication game to be successively performed, and if the bad reputation score is equal to or more than the predetermined value, the player is prevented from participating in the communication game, and thus it is possible to detect an illegal act, such as remodeling of the game program, unexpectedly use of the game program and an unpleasant act, such as an excessive harassing behavior to the opponent by an indirect method, and reduce and avoid such actions.

In addition, in the first embodiment, the content of the communication game is not explained in detail, but the attribute (physical strength value, level, technique, performance, etc.) of the player character in the communication game may be changed in correspondence with the bad reputation score, and specifically, the player having a high bad reputation score may be set to be placed in an disadvantageous situation in the communication game, for example. As the bad reputation score is gradually or linearly increased, the attribute of the player character may be similarly changed gradually or linearly. Without being restricted to the attribute of the player character, the player having a high bad reputation score may be placed in a disadvantageous situation in a game field and a course. Here, the bad reputation score is managed by the server 102, and thus, at a start of the communication game, data for changing the attribute of the player character in correspondence with the bad reputation score has to be transmitted from the server 102 to each of the game apparatuses 10. Alternatively, the bad reputation score is transmitted to each of the game apparatuses 10, and the game apparatus 10 may change the attribute value of the own player character in correspondence with the bad reputation score.

Additionally, in the first embodiment, when the communication game is started, operation data or result data is transmitted and received between the game apparatuses, but there is no need of being restricted thereto. For example, the operation data or the result data may be transmitted and received via the server. Furthermore, the server which receives the operation data from each game apparatus executes the game processing, and the result may be transmitted to each of the game apparatuses as result data. In a case that the server executes the game processing in this manner, by comparing the bad reputation scores among the players, the attribute of the player character can be changed on the server as described above. Furthermore, in place of changing the attribute of the player character, by comparing the bad reputation scores among the respective players, the server can reflect the comparison result on the game processing. For example, in a case that a fighting game is played, the bad reputation scores are compared between the players, and depending on the greatness of the bad reputation score, the magnitude of the offensive power of the player character on the offensive side can be changed, or the magnitude of the subtracted value of the life of the player character on the defensive side can be changed.

In addition, in the first embodiment, when the game apparatus applies for participation in the next communication game, in a case that the currently-battling flag corresponding to this game apparatus is turned on by turning on and off the currently-battling flag, the number of refusals of continuation as to this game apparatus may be added by one, but when the communication game is prematurely ended, the number of refusals of continuation may be added by one. In such a case, there is no need of being provided with the currently-battling flag, and the number of refusals of continuation of the game apparatus which has not received the currently-connecting message within the predetermined time may be added by one.

That is, in the entire processing by the CPU 102a of the server 102 shown in FIG. 12-FIG. 16, the processing in the steps S73, S75, S93, S103 and S105 may be deleted, and processing of adding the number of refusals of continuation by one may be executed as to the game apparatus from which the currently-connecting message has not been received within the predetermined time from when "YES" is determined in the step S119 to the step S127.

Furthermore, in the first embodiment, the hand-held type game apparatus is explained, but a console type game apparatus, such as a game apparatus for home use, an arcade game machine, etc. may be utilized.

Additionally, the game apparatus may be connected to a network by using a cable.

In addition, the configuration of the game apparatus is not required to be restricted to that of the first embodiment. For example, one display (LCD) and one camera may be possible. Furthermore, the touch panel need not be provided.

Second Embodiment

The game system 100 of the second embodiment is configured to, in a case that a game apparatus 10 does not receive operation data (or result data) from another game apparatus 10 within a predetermined time, transmit a notification that the other game apparatus 10 makes disconnection to the server 102, and to count the number of refusals of continuation as to the game apparatus 10 for which the disconnection is notified in place of adding the number of refusals of continuation in correspondence with the state (on/off) of the currently-battling flag 154h at a time of application for participation in the communication game, and transmitting a currently-connecting message to the server 102 by each game apparatus 10 during execution of the communication game in the first embodiment. The game system 100 of the second embodiment is explained below, but the content overlapped with that explained in the first embodiment is omitted.

Although illustration is omitted, in the second embodiment, the currently-battling flag 154h is not used, and therefore, the currently-battling flag 154h is not stored in the data memory area 154 of the RAM 102b of the server 102. Thus, the currently-battling flag 154h is not stored (backed up) in the database 106. Furthermore, the processing of transmitting all participant connecting data and disconnection count data to each game apparatus 10 in response to the currently-connecting message being received is not required, and therefore, the connection confirming program 152g is not stored in the program memory area 152. Furthermore, in the second embodiment, when the disconnection information from the game apparatus 10 is received according to the communication processing program 152b, the continuation refusal count counting program 152i adds the number of refusals of continuation of the game apparatus 10 (player) corresponding to the identification information included in the disconnection notification.

On the other hand, although illustration is omitted, in the program memory area 52 of the main memory 50 of the game apparatus 10, a program for, when operation data (or result data) is not received from another game apparatus 10 within a predetermined time, transmitting a disconnection notification notifying that the other game apparatus 10 prematurely ends the communication game and including the identification information of the other game apparatus 10 to the server 102 is stored in place of the connection confirming program 202f.

Thus, in the second embodiment, a part of the entire processing by the CPU 50 of the game apparatus 10 shown in the first embodiment is modified, and a part of the entire processing by the CPU 102a of the server 102 shown in the first embodiment is also modified. The different processing is specifically explained below.

Figure 18:
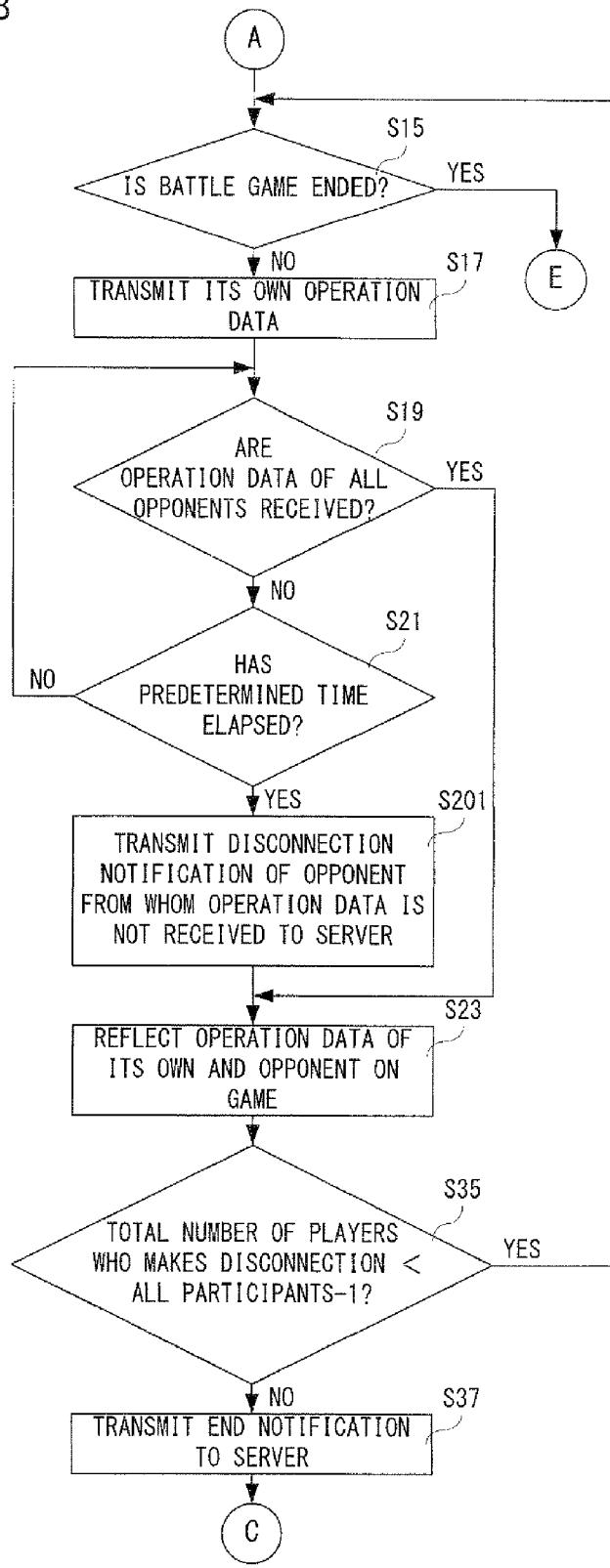
FIG. 18 is a flowchart showing a part of entire processing by the CPU of the game apparatus of a second embodiment.

In the second embodiment, as shown in FIG. 18, in a case that there is an opponent from whom operation data is not received within a predetermined time, that is, if "YES" in the step S21, the CPU 50 of the game apparatus 10 transmits the disconnection notification as to the opponent from whom the operation data is not received to the server 102 in a step S201. Here, the CPU 50 transmits the disconnection notification including the identification information as to the game apparatus 10 of the opponent from which operation data is not received to the server 102. It should be noted that in a case that there are a plurality of game apparatuses 10 of the opponents from each of which the operation data is not received within the predetermined time, the disconnection notification including identification information as to each of the plurality of game apparatuses 10 is transmitted to the server 102.

The disconnection notification is thus transmitted to the server 102, and therefore, the currently-connecting message is not required to be transmitted to the server 102 from each of the game apparatuses 10. Thus, in the second embodiment, the processing in the steps S25 to S33 shown in the first embodiment is omitted as shown in FIG. 18.

Figure 19:
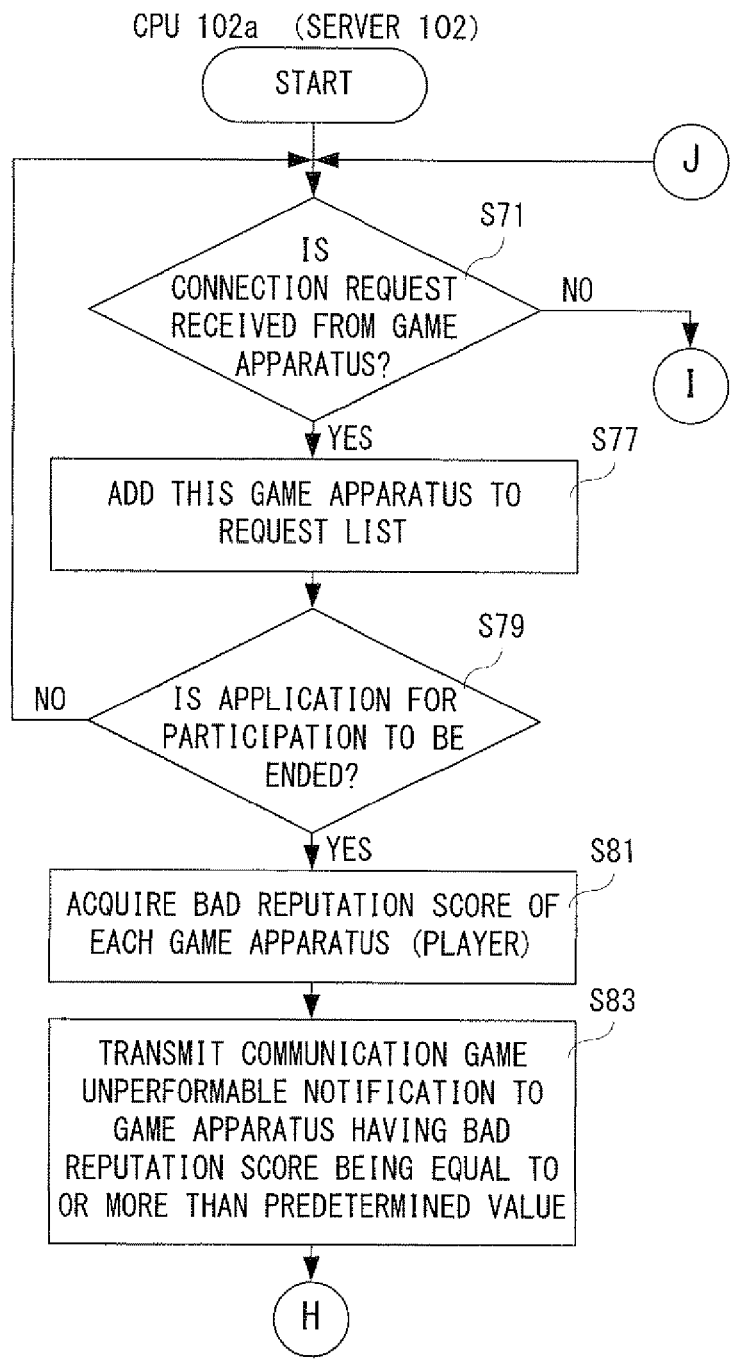
FIG. 19 is a flowchart showing a part of entire processing by the CPU of the server of the second embodiment.
Figure 20:
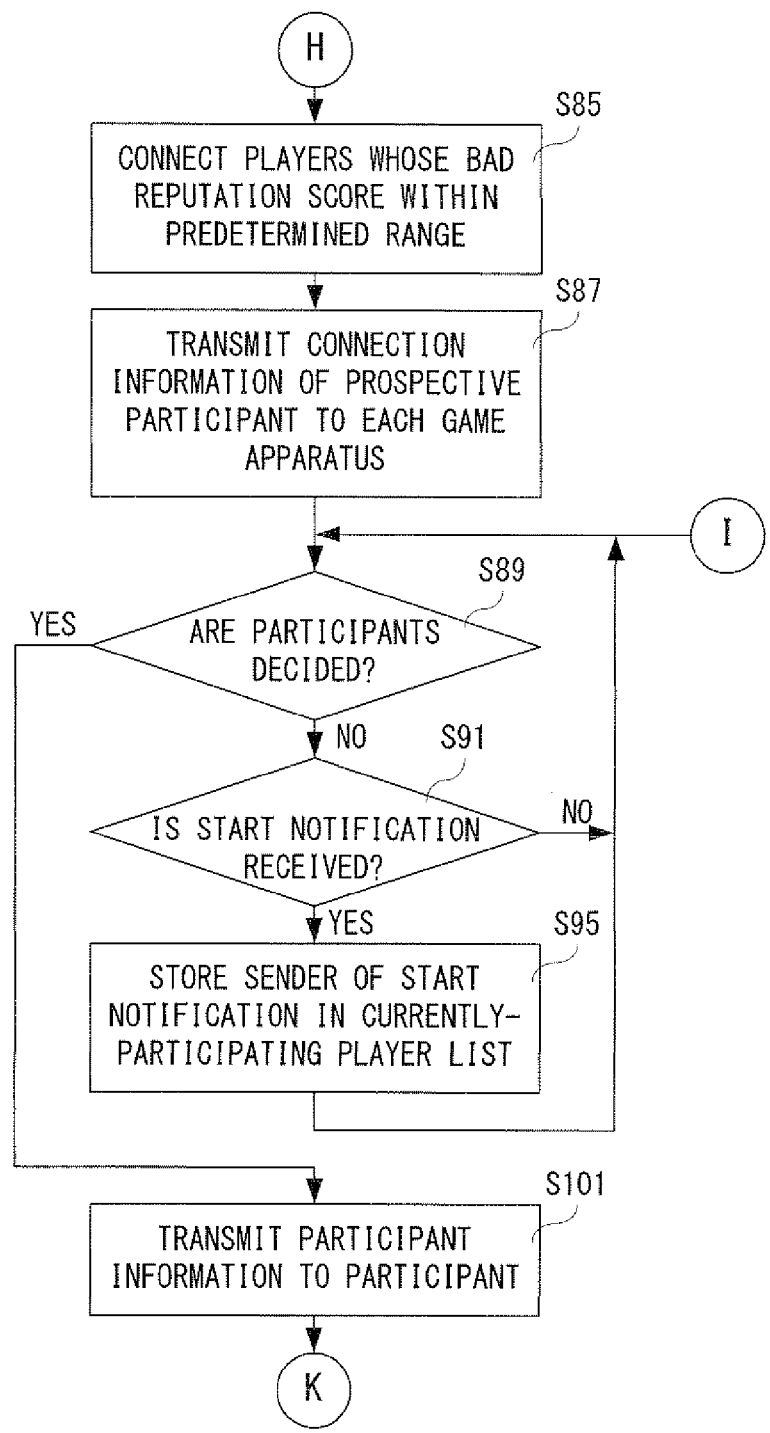
FIG. 20 is a flowchart showing a second part of the entire processing by the CPU of the server of the second embodiment, and the sequel to FIG. 19.
Figure 21:
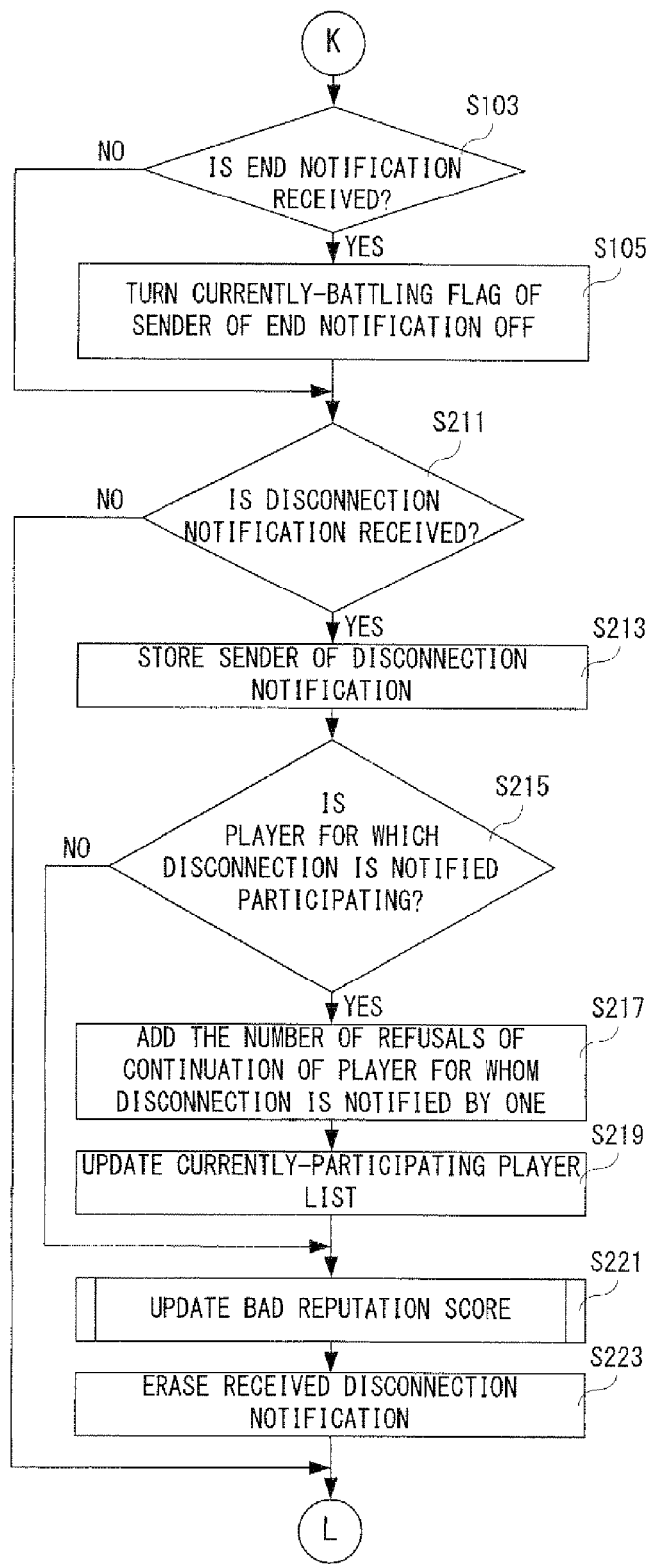
FIG. 21 is a flowchart showing a third part of the entire processing by the CPU of the server of the second embodiment, and sequel to FIG. 20.
Figure 22:
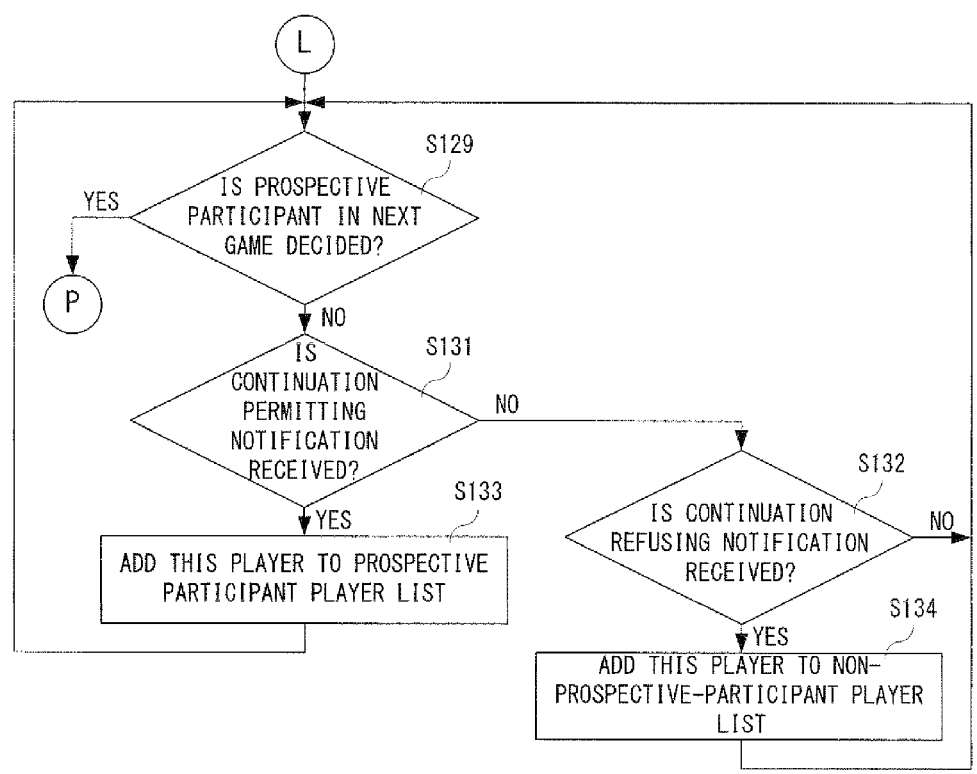
FIG. 22 is a flowchart showing a fourth part of the entire processing by the CPU of the server of the second embodiment, and the sequel to FIG. 21.

On the other hand, in the entire processing by the CPU 102a of the server 102, as shown in FIG. 19 and FIG. 20, the processing in the steps S73, S75, S93, S103 and S105 as to the currently-battling flag 154h is erased. Furthermore, a disconnection notification is transmitted from the game apparatus 10 as required in place of the currently-connecting message, and therefore, in place of the processing in the steps S111 to S127, processing in steps S211 to S223 is executed as shown in FIG. 21 and FIG. 22.

More specifically, the CPU 102a determines whether or not the disconnection notification is received in the step S211. If "NO" in the step S211, that is, if the disconnection notification is not received, the process proceeds to a step S129 shown in FIG. 22. On the other hand, if "YES" in the step S211, that is, if the disconnection notification is received, the identification information of the game apparatus 10 being a sender of the disconnection notification is temporarily stored in a buffer area (not illustrated) of the RAM 102b in the step S213. In the next step S215, it is determined whether or not the player (the game apparatus 10 being the sender of the disconnection notification who has not received the operation data from the opponent) for which the disconnection is notified is currently participating in the communication game. Here, the CPU 102a determines whether or not the premature ending flag set by being brought into correspondence with the identification information included in the disconnection notification is turned off with reference to the currently participating player list data 154d.

If "NO" in the step S215, that is, if the notified player is not participating in the communication game, the process proceeds to the step S221 as it is. On the other hand, if "YES" in the step S215, that is, if the notified player is participating in the communication game, the number of refusals of continuation of the player for whom the disconnection is notified is added by one in the step S217, the currently-participating player list is updated in the step S219, and then, the process proceeds to the step S221. Here, in the step S219, the premature ending flag set by being brought into correspondence with the identification information described in the current disconnection notification is turned on. In a case that two or more pieces of identification information are described in the disconnection notification at this time, the processing in the steps S215 to S219 is executed by the number in parallel.

It should be noted that the reason why provision of the determination processing in the step S215 is that in the second embodiment, in a case that operation data has not received within the predetermined time, each game apparatus 10 transmits a disconnection notification, and therefore, the number of refusals of continuation of the game apparatus 10 who prematurely ends the communication game is added by two or more numbers at a time. For example, in a case that the battle game (communication game) is performed by four persons, when one player prematurely ends the communication game, the other three players transmit the disconnection notifications to the server. In such a case, the number of refusals of continuation is added in correspondence with all the disconnection notifications, and the number of refusals of continuation of the player (game apparatus 10) who performs premature ending is added by "3". However, the premature ending is performed once, and therefore, the number of refusals of continuation of the player who performs premature ending should be naturally added by only "1". That is, the step S215 is processing for adding the number of refusals of continuation of the game apparatus 10 who performs premature ending by "1" with respect to the one premature ending. That is, after addition of the number of refusals of continuation of the player for whom the disconnection notification is transmitted, the premature ending flag of the player has been turned on, and therefore, even if a similar notification is received from another player, "NO" is determined in the step S215, and therefore, the number of refusals of continuation of the player for whom the disconnection notification is redundantly transmitted is not added redundantly.

In the step S221, the bad reputation updating processing shown in FIG. 17 is executed. Here, in the step S221, the bad reputation score as to the player of the game apparatus 10 being the sender of the disconnection notification whose identification information is temporarily stored in the step S213 is updated. In the next step S223, the received disconnection notification is erased, and the process proceeds to the step S129 shown in FIG. 22. Here, in the step S223, the identification information of the game apparatus 10 being the sender of the disconnection notification is also erased (deleted).

In the second embodiment as well, similarly to the first embodiment, it is possible to reduce and avoid an illegal act due to an unexpected use of the game program and an unpleasant act, such as an excessive harassing behavior, etc. Furthermore, the presence or absence of the disconnection can be determined depending on the presence or absence of the reception of the operation data (or result data) indispensable in performing the communication game without using the currently-connecting data, and thus, it is possible to make the amount of transmission and reception of the data less and reduce traffic to the network.

In the second embodiment, an explanation is made on a case that the currently-battling flag shown in the first embodiment is not used, but similarly to the first embodiment, by using the currently-battling flag, the number of refusals of continuation may be counted. In such a case, the processing in the steps S73, S75, S93, S103 and S105 shown in the first embodiment is executed, and the processing in the steps S215 and S217 shown in FIG. 21 is deleted.

Third Embodiment

The game system 100 of the third embodiment is the same as that of the first embodiment except that the processing from when a notification of application for participation from the game apparatus 10 who wants to participate in the communication game is transmitted to when a prospective participant in the communication game is decided (matched) is performed in the server 102, and the number of refusals of continuation of its own and the bad reputation score of its own are managed in each game apparatus 10. The game system 100 of the third embodiment is explained below, but the contents similar to the first embodiment and the second embodiment are simply explained.

Figure 23:
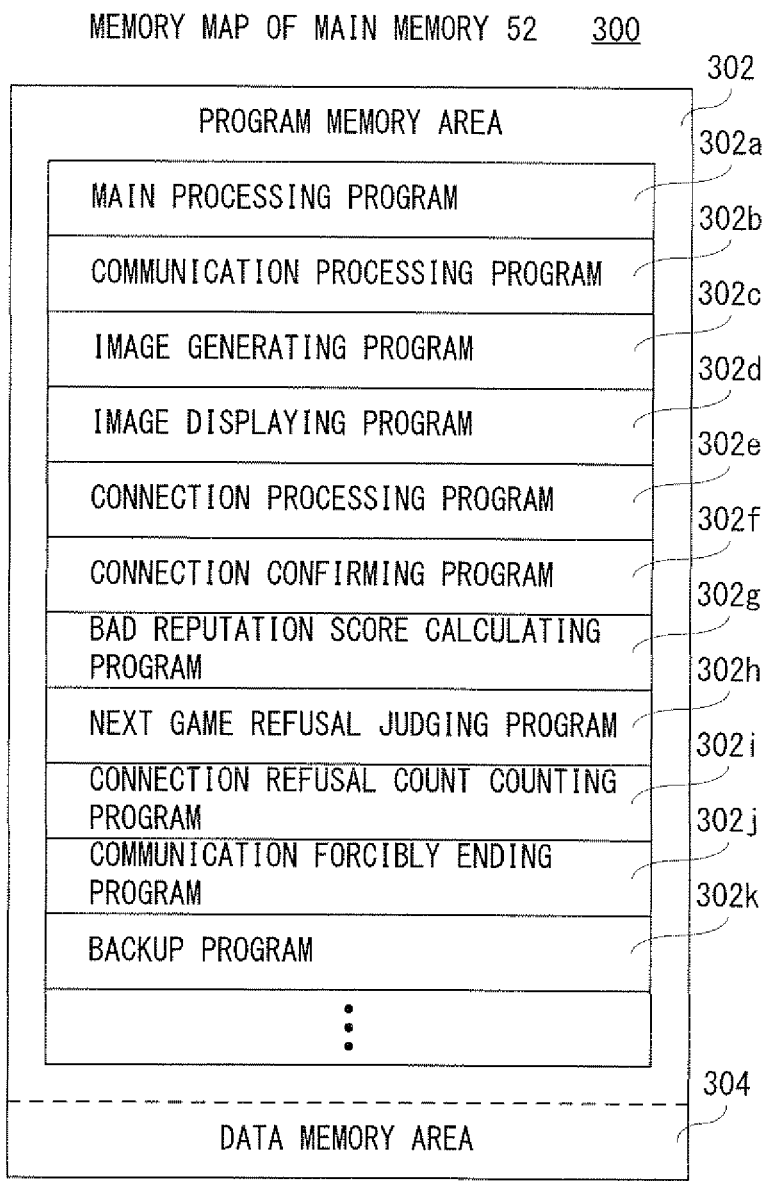
FIG. 23 is an illustrative view showing an example of a memory map of a main memory of the game apparatus of a third embodiment.

FIG. 23 shows an example of a memory map 300 of the main memory 52 of the game apparatus 10 of the third embodiment. As shown in FIG. 23, the main memory 52 includes a program memory area 302 and a data memory area 304. In the program memory area 302, a main processing program 302a, a communication processing program 302b, an image generating program 302c, an image displaying program 302d, a connection processing program 302e, a connection confirming program 302f, a bad reputation score calculating program 302g, a next game refusal judging program 302h, a connection refusal count counting program 302i, a communication forcibly ending program 302j, a backup program 302k, etc. are stored.

These programs 302a-302k are the same as the programs stored in the main memory 52 of the mage apparatus 10 explained in the first embodiment except that a bad reputation score calculating program 302g is newly added, and in place of the next game refusal judgment notifying program 202h, a continuation refusal count counting program 302i is stored, and therefore, a redundant explanation is omitted. In the third embodiment, in the main memory 52 of the game apparatus 10, the bad reputation score calculating program 302g is further stored, but the bad reputation score calculating program 302g is the same as that stored in the RAM 102b of the server 102 of the first embodiment, and therefore, the redundant explanation is omitted. Additionally, the continuation refusal count counting program 302i is a program for adding the number of refusals of continuation of it own by one when a notification of application for participation in the communication game is transmitted, in a case that the currently-battling flag 304i is turned on, or in a case that participation in the next communication game is refused.

Figure 24:
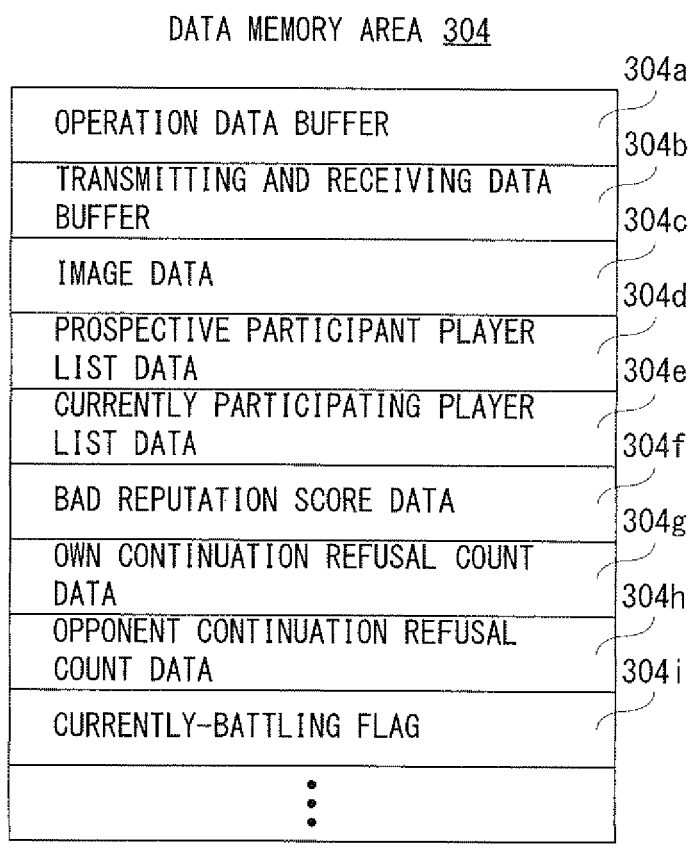
FIG. 24 is an illustrative view showing a specific example of a data memory area shown in FIG. 23.

FIG. 24 is an illustrative view showing a specific content of the data memory area 304 shown in FIG. 23. As shown in FIG. 24, in the data memory area 304, an operation data buffer 304a and a transmitting and receiving data buffer 304b are provided. Furthermore, in the data memory area 304, image data 304c, prospective participant player list data 304d, currently participating player list data 304e, bad reputation score data 304f, own continuation refusal count data 304g and opponent continuation refusal count data 304h are stored. In addition, in the data memory area 304, the currently-battling flag 304i is provided.

In the third embodiment, as described above, the number of refusals of continuation of its own and the bad reputation score of its own are managed by each game apparatus 10, and therefore, in place of the participant information data 204d, the prospective participant player list data 340d and the currently participating player list data 304e are stored in the data memory area 304. Furthermore, the bad reputation score data 304f, the own continuation refusal count data 304g, the opponent continuation refusal count data 304h are further stored. Here, the opponent continuation refusal count data 304h is data of the number of refusals of continuation as to another participant (opponent). Accordingly, in a case of a plurality of opponents, the number of refusals of continuation as to each of the opponents is described in the opponent continuation refusal count data 304*h*. These are data similar to that stored in the data memory area 154 of the RAM 102*b* of the server 102 in the first embodiment. Here, in the third embodiment, the own continuation refusal count data 304*g* and the opponent continuation refusal count data 304*h* are separately described, but these correspond to the continuation refusal count data 154*g* in the first embodiment. In addition, in the third embodiment, in the data memory area 304 of the game apparatus 10, a currently-battling flag 304*i* is provided, but this is a flag as to only its own game apparatus 10. These are similar to those explained in the first embodiment, and thus, the redundant explanation is omitted.

In the third embodiment, the CPU 50 of each game apparatus 10 executes entire processing shown in FIG. 25 to FIG. 29. Although detailed explanation and illustration are omitted, in the third embodiment, the server 102 repetitively executes the processing in the steps S71 to S87 shown in the first embodiment. Furthermore, the processing the same as that explained in the first embodiment is simply explained.

Figure 25:
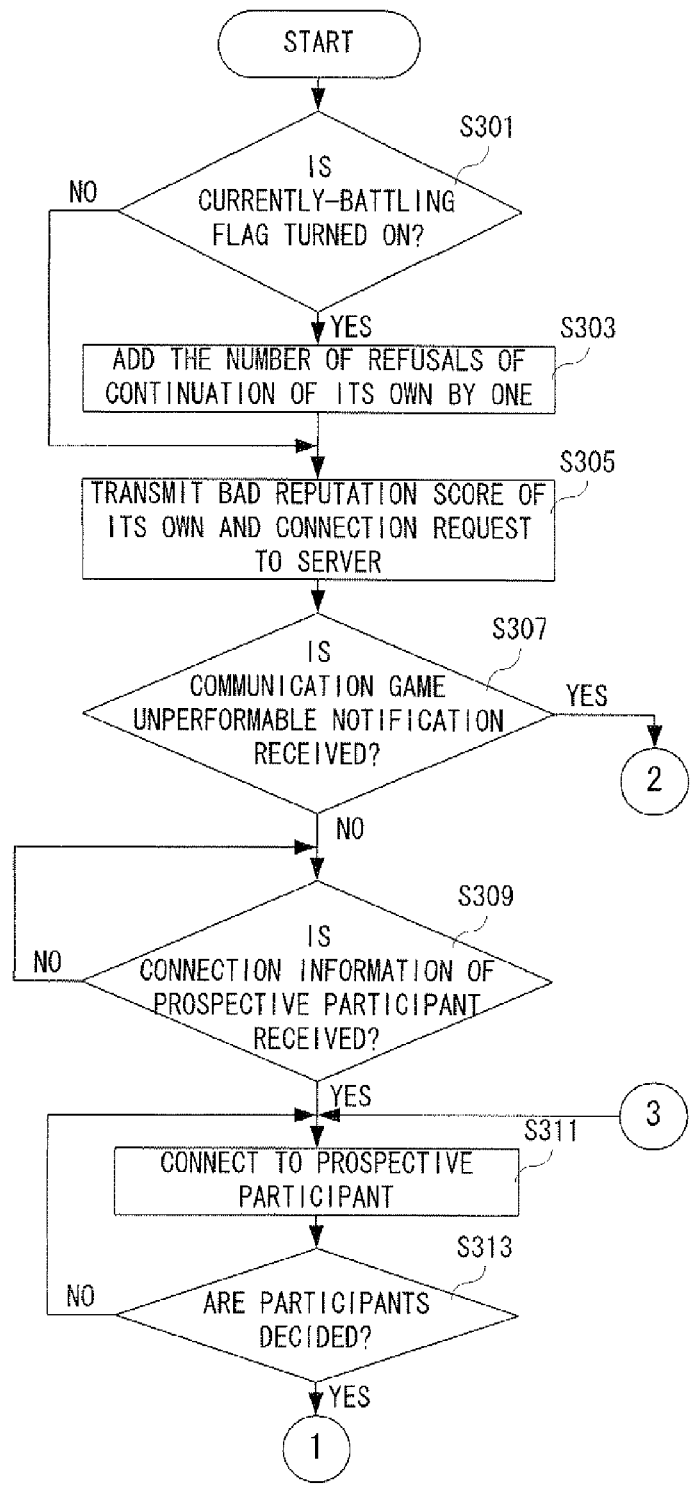
FIG. 25 is a flowchart showing a part of the entire processing by the CPU of the game apparatus of the third embodiment.
Figure 26:
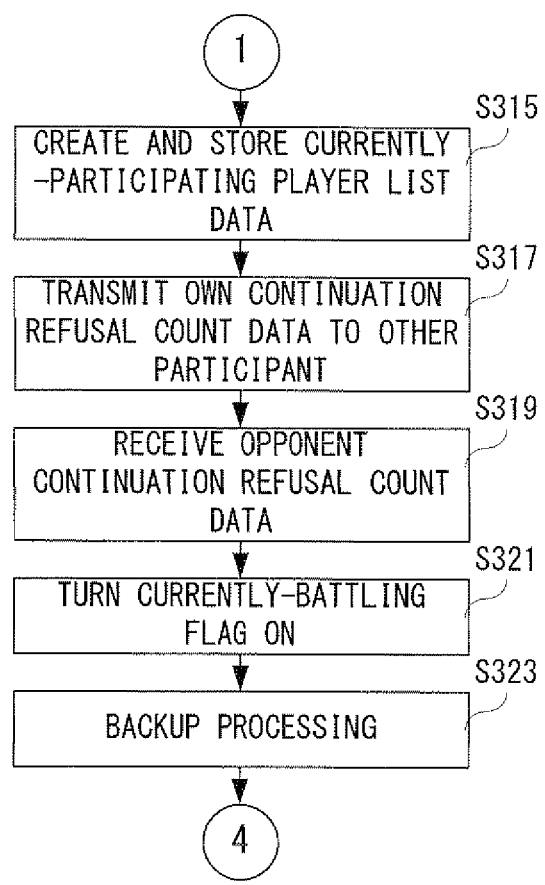
FIG. 26 is a flowchart showing a second part of the entire processing by the CPU of the game apparatus of the third embodiment, and the sequel to FIG. 25.

As shown in FIG. 25, when starting the entire processing, the CPU 50 determines whether or not the currently-battling flag 304*i* is turned on in a step S301. Although illustration is omitted, when starting the entire processing, the CPU 50 reads the backup data, the bad reputation score data 304*f*, the own continuation refusal count data 304*g*, the currently-battling flag 304*i*, etc. from the memory cards 26, 28 or the memory for saved data 56 onto the data memory area 304. If "NO" in the step S301, that is, if the currently-battling flag 304*i* is turned off, the process proceeds to a step S305 as it is. On the other hand, if "YES" in the step S301, that is, if the currently-battling flag 304*i* is turned on, the number of refusals of continuation of its own is added by one in a step S303, and the process proceeds to the step S305.

In the step S305, its own bad reputation score and a connection request are transmitted to the server 102. In a next step S307, it is determined whether or not a communication game unperformable notification is received from the server 102. If "YES" in the step S307, that is, if a communication game unperformable notification is received, the communication is ended in the step S365 shown in FIG. 29 to end the entire processing. On the other hand, if "NO" in the step S307, that is, if a communication game unperformable notification is not received, it is determined whether or not the connection information of the prospective participant is received from the server 102 in a step S309.

Here, in the third embodiment, the bad reputation score is managed in its own game apparatus 10, and therefore, permitting or not permitting execution of the communication game may be made not by the server 102 but by the game apparatus 10 itself. In such a case, the processing in the step S307 is deleted and placed between the processing in the step S303 and the step S305 to determine whether or not the bad reputation score is equal to or more than a predetermined value. If the bad reputation score is equal to or more than the predetermined value, the process proceeds to the step S365. On the other hand, if the bad reputation score is less than the predetermined value, the processing in the step S305 is executed.

Returning to FIG. 25, if "NO" in the step S309, that is, if the connection information of the prospective participant is not received, the processing in the step S309 is repeated again. On the other hand, if "YES" in the step S309, that is, if the connection information of the prospective participant is received, a connection is established with the prospective participant in a step S311. That is, a connected state is established with the game apparatus 10 of the prospective participant. Although illustration is omitted, when the connection information of the prospective participant is received from the server 102 in the third embodiment, the game apparatus 10 cancels the connection with the server 102.

In a succeeding step S313, it is determined whether or not the participants are decided. Here, the CPU 50 determines whether or not connected states with all the prospective participants are established on the basis of the connection information received from the server 102 and whether or not a predetermined time has elapsed from the start of the connection processing with the prospective participant. If "NO" in the step S313, that is, if the participants are not decided, the process returns to the step S311 as it is. On the other hand, if "YES" in the step S313, that is, if the participants are decided, the currently participating player list data 304*e* is created and stored in a step S315 shown in FIG. 26 and the own continuation refusal count data 304*g* is transmitted to the opponent in a step S317.

Here, the currently-participating player list indicated by the currently participating player list data 304*e* may be the same as that of the first embodiment shown in FIG. 6, but in the third embodiment, the content about the own game apparatus 10 (identification information and premature ending flag) may not be described (registered) in the currently-participating player list. This holds true for the prospective participant player list (not illustrated).

In a succeeding step S319, the opponent continuation refusal count data 304*h* is received. In a next step S321, the currently-battling flag 304*i* is turned on, and in a step S323, the backup processing is executed. Here, out of the data and flags stored in the data memory area 304, the above-described backup data is stored in the memory cards 26, 28 and the memory for saved data 56.

For simplicity, in the third embodiment, in the step S319, receiving all the continuation refusal count data 304*h* of the opponents (other participants) is a precondition, but whether or not all the continuation refusal count data 304*h* of the opponents are received may be determined. Furthermore, in such a case, in a case that no data is received even after a lapse of a predetermined time, the opponent from which the continuation refusal count data 304*h* is not received is erased (deleted) from the currently-participating player list, and the opponent may not be included in the participants.

Figure 27:
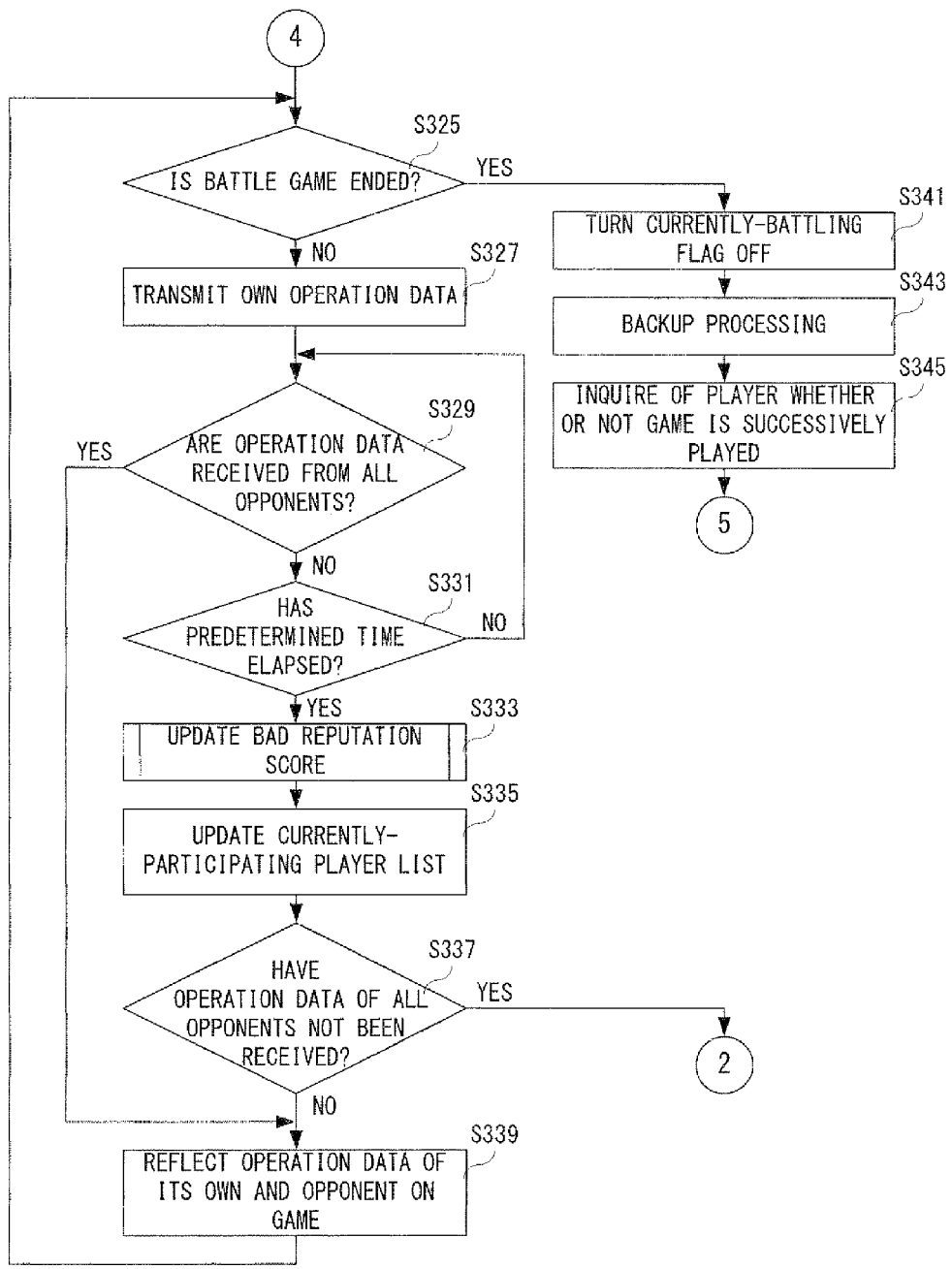
FIG. 27 is a flowchart showing a third part of the entire processing by the CPU of the game apparatus of the third embodiment, and the sequel to FIG. 26.

As shown in FIG. 27, in a next step S325, it is determined whether or not the battle game is ended. If "NO" in the step S325, that is, if the battle game is not ended, the own operation data is transmitted to the game apparatus 10 of the opponent in a step S327. Then, in a step S329, it is determined whether or not operation data are received from all the opponents. If "YES" in the step S329, that is, if the operation data are received from all the opponents, the process proceeds to a step S339 as it is. On the other hand, if "NO" in the step S329, that is, if there is an opponent from whom the operation data is not received, it is determined whether or not a predetermined time has elapsed in a step S331.

Here, in the step S331, the CPU 50 determines whether or not a predetermined time (10 seconds, for example) has elapsed after execution of the processing in the step S327 with reference to the time counted by the RTC 68.

Additionally, in the third embodiment, the operation data is transmitted and received between the game apparatuses 10, but the CPU 50 of each game apparatus 10 executes the game processing according to an operation by the player, to thereby transmit and receive the result data.

If "NO" in the step S331, that is, if a predetermined time has not elapsed, the process returns to the step S329. On the other hand, if "YES" in the step S331, that is, if a predetermined time elapses, the own bad reputation updating processing is executed according to the flowchart shown in FIG. 17 in a step S333.

In a next step S335, the currently-participating player list is updated. That is, the CPU 50 turns on the premature ending flag that is set in correspondence with the identification information of the opponent (player) from which the operation data has not been received for a predetermined time in the currently-participating player list indicated by the currently participating player list data 304e.

Successively, in a step S337, it is determined whether or not the operation data of all the opponents have not been received. Here, the CPU 50 determines whether or not the premature ending flags set with respect to the identification information of all the opponents with reference to the currently-participating player list are turned on. That is, it is determined whether or not the participant in the communication game is only the own game apparatus 10. If "YES" in the step S337, that is, if the operation data of all the opponents have not received, the process proceeds to the step S365 shown in FIG. 29 in order to end the communication game. On the other hand, if "NO" in the step S337, that is, if the operation data of at least one opponent has been received, the operation data of its own and the opponent are reflected on the communication game in the step S339, and the process returns to the step S325.

Furthermore, if "YES" in the step S325, that is, if the battle game is to be ended, the currently-battling flag 304i is turned off in a step S341. That is, normally ending the communication game is recorded. In a next step S343, the backup processing is executed. The backup processing is the same as that in the above-described step S323. Next, in a step S345, the player is inquired whether the battle game is to be successively performed. Here, as explained in the first embodiment, the selection screen is displayed on the first LCD 16 or the second LCD 18 of the game apparatus 10, or both of them.

Figure 28:
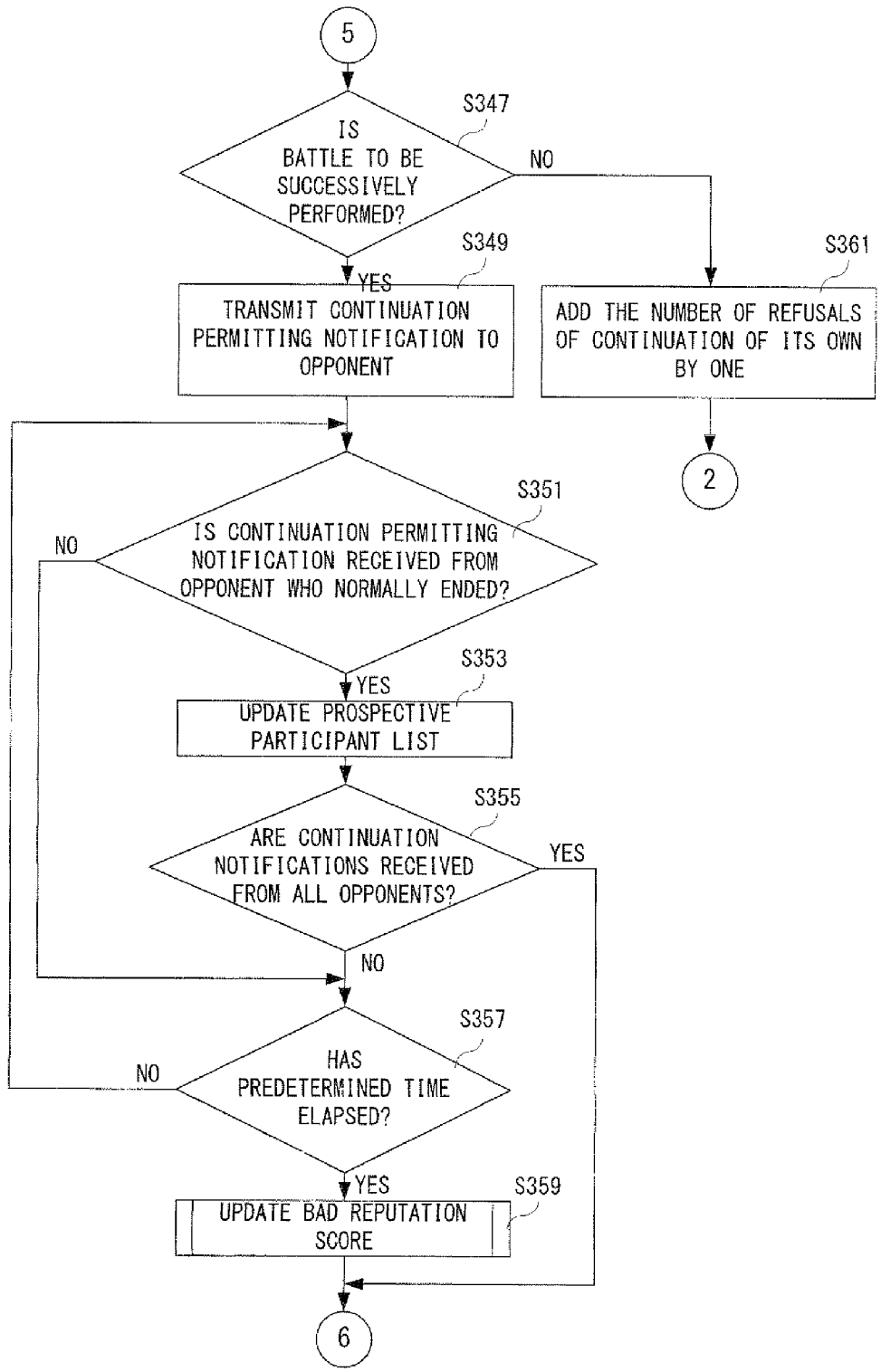
FIG. 28 is a flowchart showing a fourth part of the entire processing by the CPU of the game apparatus of the third embodiment, and the sequel to FIG. 27.

As shown in FIG. 28, in a next step S347, it is determined whether or not the battle game is to be successively performed. If "NO" in the step S347, that is, if the battle game is not successively performed, the number of refusals of continuation of its own is added by one in a step S361, and then, the process proceeds to the step S365. On the other hand, if "YES" in the step S347, that is, if the battle is to be successively performed, the continuation permitting notification is transmitted to the opponent in a step S349. Here, the continuation permitting notification is transmitted only to the game apparatus 10 of the opponent who normally ended the immediately preceding communication game.

In a next step S351, it is determined whether or not the continuation permitting notification is received from the opponent who normally ended the immediately preceding communication game. If "NO" in the step S351, that is, if the continuation permitting notification is not received, the process proceeds to a step S357 as it is. On the other hand, if "YES" in the step S351, that is, if the continuation permitting notification is received, the prospective participant list is updated in a step S353. Here, the identification information of the game apparatus 10 being the sender of the continuation permitting notification is added to the prospective participant list.

Successively, in a step S355, it is determined whether or not the continuation permitting notifications are received from all the opponents who normally ended the immediately preceding communication game. More specifically, the CPU 50 determines whether or not the identification information of all the game apparatuses 10 for each of which the premature ending flag is turned off in the currently-participating player list are described in the prospective participant list. If "YES" in the step S355, that is, if the continuation permitting notifications are received from all the opponents who normally ended the immediately preceding communication game, the process proceeds to a step S363 shown in FIG. 29 as it is. On the other hand, if "NO" in the step S355, that is, if there is the opponent who does not receive the continuation permitting notification out of the opponents who normally ended the preceding communication game, the process proceeds to the step S357.

In the step S357, it is determined whether or not a predetermined time has elapsed. Here, the CPU 50 determines whether or not a predetermined time (60 seconds, for example) has elapsed after execution of the processing in the step S349 with reference to the time counted by the RTC 68. If "NO" in the step S357, that is, if a predetermined time has not elapsed, the process returns to the step S351. On the other hand, if "YES" in the step S357, that is, if a predetermined time has elapsed, the own bad reputation updating processing is executed according to the flowchart shown in FIG. 17 in a step S359, and the process proceeds to the step S363.

Figure 29:
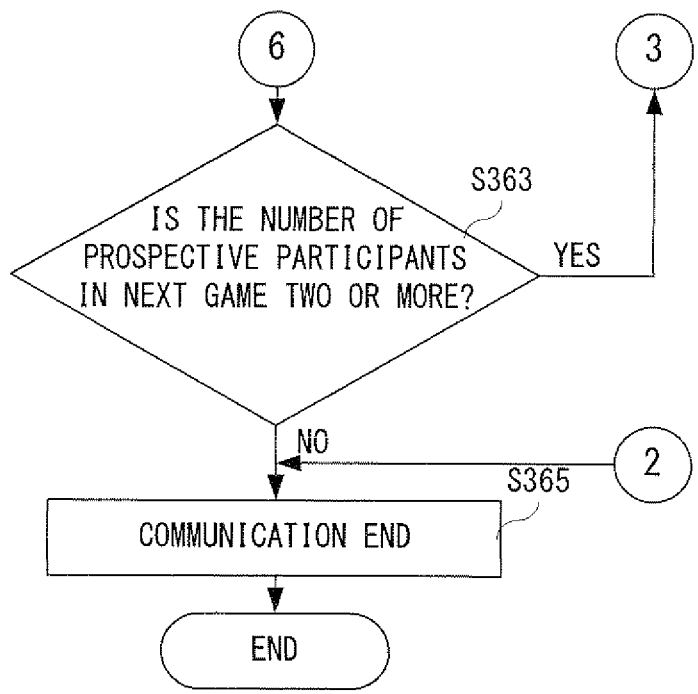
FIG. 29 is a flowchart showing a fifth part of the entire processing by the CPU of the game apparatus of the third embodiment, and the sequel to FIG. 28.

As shown in FIG. 29, it is determined whether or not the number of prospective participants in the next game is two or more in the step S363. If "YES" in the step S363, that is, if the number of prospective participants in the next game is two or more, the process returns to the step S311 shown in FIG. 25. On the other hand, if "NO" in the step S363, that is, if the number of prospective participants in the next game is one (its own game apparatus), the communication is ended in the step S365 to thereby end the entire processing.

According to the third embodiment, similarly to the first embodiment, it is possible to reduce or avoid an illegal act due to an unexpected use of the game program and an unpleasant act, such as an excessive harassing behavior, etc.

In addition, according to the third embodiment, after participants in the communication game are decided, the processing is executed between the game apparatuses, that is, the server is not required to manage a state of each game apparatus and to execute the game processing during the communication game, and therefore, it is possible to reduce the load on the server.

Here, in the third embodiment, the opponent of the communication game is matched (decided) by the server, but in another embodiment, this may be decided between the game apparatuses without using the server. In such a case, a game apparatus which recruits the opponents of the communication game functions as a parent device and the game apparatus applies for participation in the communication game with respect to the parent device functions as a child device, for example, and after the opponents are decided, the communication game is executed. Thus, the server need not be used.

Furthermore, in the third embodiment, in a case that there is the game apparatus who will not participate in the next communication game out of the game apparatuses which normally ended the immediately preceding communication game, irrespective of the number, its own bad reputation score is updated, but similar to the first embodiment and the second embodiment, only when the participants who will not participate more than a predetermined number exist, its own bad reputation score may be updated.

In addition, in the third embodiment, if playing the communication game with the same opponent again is not selected, but if stopping the communication game or playing the battle game with another player is selected, that is, if participating in the next communication game is refused, the number of refusals of continuation of its own is added by one, and the communication is ended. Here, in a case that participating in the next communication game is refused, the continuation refusing notification may be transmitted to the game apparatus 10 of another participant before and after the number of refusals of continuation of its own is added by one. In such a case, it is considered that if a continuation refusing notification is received from the opponent who normally ended the game, the opponent may not be added to the prospective participant list. More specifically, processing of transmitting the continuation refusing notification to the opponent is added after "NO" is determined in the step S347, and processing of determining whether or not the continuation refusing notification is received is added after "NO" is determined in the step S351. In a case that the continuation refusing notification is received, processing of not adding to the prospective participant list is executed, and then, the process proceeds to the step S355. Accordingly, in the step S355, the CPU 50 determines whether or not the continuation permitting notification or the continuation refusing notifications are received from all the participants. Here, when it is determined that the continuation refusing notifications are not received, the process may proceed to the step S357.

In addition, in the above-described first embodiment and second embodiment, the server manages the bad reputation score, but in the third embodiment, each game apparatus 10 manages the bad reputation score, and therefore each game apparatus may change the attribute of the player character according to the bad reputation score at a start of the game. In such a case, the CPU 50 may execute processing of changing the attribute of the player character according to the bad reputation score between the step S323 and the step S325, for example.

In each of the above-described embodiments, in a case that the bad reputation score of the game apparatus (player) is equal to or more than the predetermined value, participating in the communication game by the player is refused, and in a case that a game apparatus is ended halfway of the communication game even once, or in a case that the game apparatus is refused to participate in the next communication game even once, participating in the communication game by the game apparatus may be refused.

In each of the above-described embodiments, in a case that the bad reputation score is updated, the score value to be added is evaluated so as to be added, but the number of times that the continuation of the communication game is refused may be merely counted. In such a case, if the bad reputation score of the game apparatus (player) is equal to or more than the predetermined value, that is, if the number of time that the continuation of the communication game is refused is equal to or more than the predetermined number of times, participating in the communication game by the game apparatus may be refused.

In addition, in each of the above-described embodiments, the bad reputation score is updated in a case that the communication game is prematurely ended, and in a case that participation in the next communication game is refused, but the bad reputation score may be updated only in any one of the cases.

In addition, in each of the above-described embodiments, the bad reputation updating processing is executed between a case that the communication game is prematurely ended, and a case that participation in the next communication game is refused, but depending on the cases, the score value to be added may be changed or a correction method of the score value to be added may be changed. For example, in a case that the communication game is prematurely ended, due to the degradation of the communication environment, the communication may be stopped dead, and therefore the score value to be added may be set to a value smaller than that of a case that participation in the next communication game is refused. Furthermore, in a case that it is considered that prematurely ending the communication game is more malicious than refusal of participating in the next communication game, the score value to be added in a case that the communication game is prematurely ended may be set to a larger value. Which is selected is a requirement arbitrarily decided by a developer, etc.

In each of the above-described embodiments, when a prospective participant as an opponent of the communication game is matched in the server, the player (game apparatus) who has the same or the same level of the bad reputation score is decided, but the player himself or herself may decide the prospective participant being the opponent. In such a case, if the bad reputation score of each player is displayed, the bad reputation score can be regarded as an index when the prospective participant being the opponent is decided.

In addition, in each of the above-described embodiments, as to the player (game apparatus) whose bad reputation score is equal to or more than the predetermined value, participating in the communication game is refused, and as to the player whose bad reputation score is less than the predetermined value, players having the same or the same level of the bad reputation scores may be decided as prospective participants in the communication game, but any one of the method may only be adopted. Furthermore, in a case that the bad reputation score is less than the predetermined value, the players who apply for participation are decided as prospective participants without any restriction, but in a case that the bad reputation score is equal to or more than the predetermined value, the communication game is performed between the players having the same or the same level of bad reputation score.

Additionally, in each of the above-described embodiments, the difference between the participant who normally ended the immediately preceding communication game and the prospective participant in the next communication game is evaluated, and on the basis of the difference, the bad reputation score is updated, but the bad reputation score may be updated on the basis of the person who refuses to participate in the next communication game.

In each of the above-described embodiments, the initial value (minimum value) of the bad reputation score shall be "0", and every time that the bad reputation score is updated, the bad reputation score is added, but there is no need of being restricted thereto. For example, the initial value (maximum value) of the bad reputation score is set, and every time that the bad reputation score is updated, the bad reputation score may be subtracted. In such a case, when the bad reputation score is equal to or less than a predetermined value, participating in the communication game is refused.

In addition, in each of the above-described embodiments, only adding the bad reputation score is performed, but as to the game apparatus (player) who normally ended the communication game, the bad reputation score may be subtracted. In such a case, if the communication game is not prematurely ended, the bad reputation score is updated, and the value is subtracted.

In addition, in each of the above-described embodiments, as to the players of all the game apparatuses (players) who are refused to participate in the next communication game, the bad reputation score is updated, but this is not restricted thereto. For example, the bad reputation score may be updated as to a part of the opponents out of the opponents who play the communication game immediately before. In such a case, on the selection screen for selecting whether or not a next communication game is to be performed, an item for selecting with which player (game apparatus) the game playing is not desired to be played is provided, and the selection result may also be transmitted to the server. Furthermore, without suffering from an illegal act due to an unexpected use of the game program and an unpleasant act, such as an excessive harassing behavior, etc., the communication game may be merely stopped. Accordingly, on the selection screen for selecting whether to participate in the next communication game or not, a button image (first button image) for selecting to stop the communication game due to such the illegal act and the unpleasant act, and a button image (second button image) for merely stopping the communication game are provided are provided, and only when the first button image is turned on, the bad reputation score may be updated. This may be adopted together with the above-described update of the bad reputation score as to a part of the opponents.

Additionally, in each of the above-described embodiments, in the step S89, the server counts a time from when the connection information of the prospective participant is transmitted to the game apparatus of the participant in the immediately preceding step S87, and the participant is decided by the count value, but the game apparatus counts a time from when the connection information is received in the step S5, and in a case that the game apparatus cannot transmit a start notification to the server for a predetermined time, it notifies the fact to the server, and in response to the server receiving the notification, the game apparatus can determine that this does not become a participant.

Although certain example embodiments have been described and illustrated in detail, it is clearly understood that the same is by way of illustration and example only and is not to be taken by way of limitation, the spirit and scope of the present invention being limited only by the terms of the appended claims.

What is claimed is:

1. A game system for facilitating multiplayer gameplay of a multiplayer game over a computer network between a first computing apparatus and at least a second computing apparatus, the system comprising:
   a storage medium system configured to store at least restriction information that is associated with the first computing apparatus and/or a game player associated with the first computing apparatus; and
   a processing system that includes at least one processor, the processing system configured to:
   perform a determination that the second computing apparatus refuses to continue participation in the multiplayer gameplay of the multiplayer game with at least the first computing apparatus;
   select the first computing apparatus and the second computing apparatus for inclusion into a multiplayer game based the stored restriction information of each computing apparatus of a plurality of computing apparatuses; and
   update the stored restriction information for the video game of the first computing apparatus in correspondence with the determination,
   wherein the performed determination includes a determination that the second computing apparatus disconnected during gameplay of the multiplayer game.

2. The game system of claim 1, wherein the selected first computing apparatus and the selected second computing apparatus are associated with stored restriction information that is at least approximate to each other.

3. The game system of claim 1, wherein the processing system is further configured to process at least some functionality associated with gameplay of the multiplayer game, wherein the processing of the at least some functionality is based on the stored restriction information associated with each computing apparatus which is participating in said multiplayer game.

4. The game system of claim 3, wherein the processing system is further configured to:
   compare said stored restriction information associated with the respective computing apparatuses which are participating in said multiplayer game to obtain a comparison result,
   wherein the processing of the at least some functionality is based on the comparison result.

5. The game system of claim 3, wherein the processing system is further configured to perform a determination if the stored restriction information satisfies a predetermined condition,
   wherein the processing of the at least some functionality is based on the determination if the stored restriction information satisfies the predetermined condition.

6. The game system of claim 5, wherein the processing system is further configured to refuse participation to a multiplayer game for a computing apparatus and/or a game player associated with the computing apparatus when a value based on associated stored restriction information is equal to or more than a predetermined value.

7. The game system of claim 1, wherein
   the determination that the second computing apparatus disconnected during multiplayer gameplay of the multiplayer game includes a determination that the first computing apparatus has not received communication data from the second computing apparatus for more than a predetermined period of time.

8. The game system of claim 1, wherein the performed determination includes a determination that the second computing apparatus refuses to participate in a next multiplayer game.

9. The game system of claim 1, wherein the processing system is further configured to:
   store refusal information indicating a number of times that the second computing apparatus refuses to continue said multiplayer game; and
   update the stored restriction information for said multiplayer game of the first computing apparatus based on the stored refusal information.

10. The game system of claim 9, wherein
    a degree of change in said restriction information is relatively smaller as the number indicated by the refusal information increases.

11. The game system of claim 1, wherein the processing system is further configured to:
    determine a number of other game apparatuses that refuse to continue said multiplayer game,
    wherein said stored restriction information for said multiplayer game of the first computing apparatus is updated based on the determined number.

12. The game system of claim 1, wherein the processing system is further configured to:
    register said first computing apparatus which participates in said multiplayer game as a participant at a start of said multiplayer game, and
    accept an instruction as to whether to participate in another round of said multiplayer game again or not from said participant at an end of said multiplayer game,
    wherein the performed determination is further based on the accepted instruction.

13. The game system of claim 12, wherein the computing system is further configured to:
  acquire a difference between a number of participants in a previous multiplayer game and a number of participants in a next multiplayer game; and
  determine whether or not the acquired difference satisfies a predetermined condition,
  wherein the performed determination is further based on the determination of whether or not the acquired difference satisfies a predetermined condition.

14. The game system of claim 1, wherein the processing system is further configured to:
  match the first computing apparatus to at least a third computing apparatus in a subsequent multiplayer game based on the updated stored restriction information.

15. A non-transitory storage medium storing a program executable by a computing system that includes at least one processor, the computing system for facilitating multiplayer gameplay of a multiplayer game over a computer network between a first computing apparatus and at least a second computing apparatus, said program comprising instructions that are, when executed by the computing system, configured to:
  store at least restriction information that is associated with a first computing apparatus and/or a game player associated with the first computing apparatus;
  perform a determination that at least the second computing apparatus refuses to continue participation in the multiplayer gameplay of the multiplayer game with the first computing apparatus;
  perform a matching making service for a subsequent multiplayer game that is to include a plurality of computing apparatuses, including the first computing apparatus, the plurality of computer apparatuses for the subsequent multiplayer game determined in accordance with respective stored restriction information for each one of the plurality of computing apparatuses; and
  update the stored restriction information for the video game of the first computing apparatus in correspondence with the performed determination that at least the second computing apparatus refuses to continue participation in the multiplayer gameplay of the multiplayer game with the first computing apparatus,
  wherein the performed determination includes a determination that the second computing apparatus disconnected during gameplay of the multiplayer game.

16. The medium of claim 15, wherein the second computing apparatus is included in a plurality of computing apparatus associated with the multiplayer game and the instructions are further configured to:
  determine a number of refusals of the plurality of computing apparatus that refuse to continue the multiplayer game with the first computing apparatus,
  wherein the stored restriction information is further based on the number.

17. A multiplayer game method for facilitating multiplayer gameplay of a multiplayer game over a computer network between a first computing apparatus and at least a second computing apparatus, the method comprising:
  storing, to a storage system, at least restriction information that is associated with the first computing apparatus and/or a game player associated with the first computing apparatus;
  performing, via a computing system that includes at least one processor, a determination that at least the second computing apparatus refuses to continue participation in the multiplayer gameplay of the game with at least the first computing apparatus;
  performing a match making service by selecting the first computing apparatus and the second computing apparatus for inclusion into a multiplayer game based the stored restriction information of each computing apparatus of a plurality of computing apparatuses; and
  updating, via the computing system that includes at least one processor, the stored restriction information for the video game of the first computing apparatus in correspondence with the determination,
  wherein the performed determination includes a determination that the second computing apparatus disconnected during gameplay of the multiplayer game.

18. A device used for a game system for facilitating a multiplayer gameplay in a multiplayer game over a computer network between a first computing apparatus and at least a second computing apparatus, the device comprising:
  a storage medium system configured to store at least restriction information that is associated with said first computing apparatus and/or a game player associated with the first computing apparatus; and
  a processing system that includes at least one processor, the processing system configured to:
    perform a determination that the second computing apparatus has refused to continue participation in said multiplayer game with said first computing apparatus;
    match a plurality of computing apparatuses, including the first computing apparatus, for inclusion into a subsequent multiplayer game, selection of the plurality of computing apparatus for the subsequent multiplayer game determined in accordance with respective stored restriction information associated with each computing and/or game player; and
    update the stored restriction information for said multiplayer game of said first computing apparatus in correspondence with the determination,
  wherein the performed determination includes a determination that the second computing apparatus disconnected during gameplay of the multiplayer game.

* * * * *